United States Patent
Nabetani et al.

(10) Patent No.: US 10,257,321 B2
(45) Date of Patent: *Apr. 9, 2019

(54) WIRELESS COMMUNICATION DEVICE AND WIRELESS COMMUNICATION METHOD

(71) Applicant: Kabushiki Kaisha Toshiba, Minato-ku (JP)

(72) Inventors: Toshihisa Nabetani, Kawasaki (JP); Ryoko Matsuo, Shinagawa (JP); Tomoko Adachi, Kawasaki (JP); Tsuguhide Aoki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 73 days.

This patent is subject to a terminal disclaimer.

(21) Appl. No.: 15/255,671

(22) Filed: Sep. 2, 2016

(65) Prior Publication Data

US 2016/0373559 A1    Dec. 22, 2016

Related U.S. Application Data

(63) Continuation of application No. PCT/JP2015/056869, filed on Mar. 9, 2015.

(30) Foreign Application Priority Data

Mar. 7, 2014   (JP) .................................. 2014-045490

(51) Int. Cl.
   *H04L 29/06* (2006.01)
   *H04L 1/16* (2006.01)
   *H04W 16/28* (2009.01)

(52) U.S. Cl.
   CPC ............... *H04L 69/16* (2013.01); *H04L 1/16* (2013.01); *H04W 16/28* (2013.01)

(58) Field of Classification Search
   None
   See application file for complete search history.

(56) References Cited

U.S. PATENT DOCUMENTS

2008/0293424 A1   11/2008   Cho et al.
2010/0146358 A1    6/2010   Kazmi et al.
(Continued)

FOREIGN PATENT DOCUMENTS

JP   2010-28284 A   2/2010
JP    4444216 B2    3/2010
(Continued)

OTHER PUBLICATIONS

Zhihua Shi et al., "Linear Precoder Optimization for ARQ Packet Retransmissions in Centralized Multiuser MIMO Uplinks", IEEE Transactions on Wireless Communications, vol. 7, No. 2, Feb. 2008, pp. 736-744.*

(Continued)

*Primary Examiner* — Kouroush Mohebbi
(74) *Attorney, Agent, or Firm* — Oblon, McClelland, Maier & Neustadt, L.L.P.

(57) ABSTRACT

According to one embodiment, a wireless communication device includes: a receiver configured to receive a plurality of first frames transmitted by spatial multiplexing; and a transmitter configured to transmit a second frame containing check results indicating whether the first frames are successfully received and first information specifying at least one communication device. The receiver is configured to receive a plurality of third frames transmitted by spatial multiplexing from a communication device having transmitted the first frame the check result of which represents failure and the communication device specified in the first information.

23 Claims, 12 Drawing Sheets

(56) References Cited

U.S. PATENT DOCUMENTS

| | | | |
|---|---|---|---|
| 2011/0141901 A1 | 6/2011 | Luo et al. | |
| 2012/0076078 A1* | 3/2012 | Han | H04L 1/06 370/328 |
| 2012/0263091 A1 | 10/2012 | Kim et al. | |

FOREIGN PATENT DOCUMENTS

| | | |
|---|---|---|
| JP | 2010-525705 A | 7/2010 |
| JP | 2010-525723 A | 7/2010 |
| JP | 2012-531171 A | 12/2012 |
| JP | 2013-512613 A | 4/2013 |
| WO | WO 2014/172626 A1 | 10/2014 |

OTHER PUBLICATIONS

Lin, Tsung-Han and H. T. Kung. 2012. Concurrent Channel Access and Estimation for Scalable Multiuser MIMO Networking. School of Engineering and Applied Sciences, Harvard University, pp. 1-14.*

Zhihua Shi et al., "Linear Precoder Optimization for ARQ Packet Retransmissions in Centralized Multiuser MIMO Uplinks", IEEE Transactions on Wireless Communications, vol. 7, No. 2, Feb. 2008, pp. 736-744 (Year: 2008).*

Lin, Tsung-Han and H. T. Kung. 2012. Concurrent Channel Access and Estimation for Scalable Multiuser MIMO Networking. School of Engineering and Applied Sciences, Harvard University, pp. 1-14. (Year: 2012).*

International Preliminary Report on Patentability and Written Opinion dated Sep. 22, 2016 in PCT/JP2015/056869 (English translation only).

Robert Stacey, "11-15-0132-17-00ax-spec-framework" Specification Framework for TGax, May 25, 2016, pp. 1-61.

"Part 11: Wireless LAN Medium Access Control (MAC) and Physical Layer (PHY) Specifications" IEEE Standards Association, IEEE Std 802.11™—2012, Mar. 29, 2012, pp. 1-2695 with cover pages.

"Part 11: Wireless LAN Medium Access Control (MAC) and Physical Layer (PHY) Specifications Amendment 4: Enhancements for Very High Throughput for Operation in Bands below 6 GHz" IEEE Standards Association, IEEE Std 802.11ac™—2013, Dec. 11, 2013, pp. 1-395 with cover pages.

International Search Report dated Jun. 2, 2015 in PCT/JP2015/056869.

"Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz" IEEE P802.11ac™/D7.0, Sep. 2013, 456 Pages.

* cited by examiner

| Frame Control | Duration | RA | TA | COMMON INFORMATION | TERMINAL INFORMATION 1 | ... | TERMINAL INFORMATION n | FCS |

FIG. 3

| Frame Control | Duration | RA | TA | Bitmap | COMMON INFORMATION | TERMINAL INFORMATION 1 | ... | TERMINAL INFORMATION n | FCS |

FIG. 6

WIRELESS COMMUNICATION DEVICE AND WIRELESS COMMUNICATION METHOD

CROSS REFERENCE TO RELATED APPLICATIONS

This application is a Continuation of International Application No. PCT/JP2015/056869, filed on Mar. 9, 2015, the entire contents of which is hereby incorporated by reference.

FIELD

Embodiments described herein relate to a wireless communication device and a wireless communication method.

BACKGROUND

CSMA/CA (Carrier Sense Multiple Access/Collision Avoidance), which adopts a wireless LAN (Local Area Network) based on the IEEE802.11 standard as a wireless communication system communicating between a wireless access point and a wireless terminal, is widely known. IEEE Std 802.11™-2012 and IEEE Std 802.11ac™-2013 have been known as specifications of wireless LAN. The IEEE802.11ac standard adopts downlink multiuser MIMO (DL-MU-MIMO) technology that extends MIMO (Multi-Input Multi-Output) technology. In the downlink multiuser MIMO, an access point uses a technology called beam forming to be capable of data transmission to individual wireless terminals by way of beams spatially orthogonal to each other, allowing different data to be simultaneously transmitted to a plurality of wireless terminals. This makes it possible to improve a system throughput.

Additionally, in order to attain a further high-efficiency, a Study Group (SG) called IEEE802.11 HEW (High Efficiency WLAN) for investigating a standard successive to the IEEE802.11ac standard was approved in May, 2015, where a technology for aiming at the high-efficiency has been investigated. One of technology candidates for that includes an uplink multiuser MIMO (UL-MU-MIMO) technology. In the uplink multiuser MIMO, a plurality of wireless terminals perform data transmission at the same timing to an access point by way of beams spatially orthogonal to each other, giving high-efficiency of the uplink transmission.

In order to sufficiently obtain effects of spatial multiplexing by the multiuser MIMO, a user multiplexing number is preferably maintained above a certain value even in retransmitting the data. For example, assume that in a new transmission, spatial multiplexing transmission is performed by four wireless terminals, where a CRC (Cyclic Redundancy Check) error occurs only in any of the data. In this case, if the data only is retransmitted, as a result, user multiplex is not performed and the system throughput decreases.

There has been known, as a method resolving that, when the access point performs retransmission in downlink multiuser MIMO transmission, new data is newly multiplexed in addition to retransmission data to improve a usage efficiency. This allows the user multiplexing number above a certain value to be maintained even in the retransmission. Therefore, even if the retransmission occurs, the system throughput can be improved owing to the spatial multiplexing.

However, this method is specialized for the downlink multiuser MIMO without taking account of the uplink multiuser MIMO. In other words, in a case of the downlink multiuser MIMO transmission, the access point can perform the transmission in combination of the retransmission data and the new data based on a determination by the access point on the basis of an acknowledgement response result sent as a reply from each wireless terminal.

On the other hand, in a case of the uplink multiuser MIMO transmission, individual wireless terminals are multiuser MIMO transmitting devices, which means that a plurality of transmission terminals exist. For this reason, a wireless terminal wanting to transmit the new data cannot determine whether to simultaneously multiplex the new data to transmit at the same time as a wireless terminal transmitting the retransmission data. Further, in the uplink multiuser MIMO, there is no scheme for multiplexing and transmitting the retransmission data and the new data by a plurality of wireless terminals. Therefore, if the data retransmission occurs, the high-efficiency uplink multiuser MIMO transmission maintaining the user multiplexing number above a certain value cannot be achieved.

BRIEF DESCRIPTION OF THE DRAWINGS

FIG. 3 is a diagram showing an example of a frame format for a notification frame according to the first embodiment;

FIG. 6 is a diagram showing an example of a frame format for an acknowledgement response frame with notification function according to the first embodiment;

DETAILED DESCRIPTION

According to one embodiment, a wireless communication device includes: a receiver configured to receive a plurality of first frames transmitted by spatial multiplexing; and a transmitter configured to transmit a second frame containing check results indicating whether the first frames are successfully received and first information specifying at least one communication device. The receiver is configured to receive a plurality of third frames transmitted by spatial multiplexing from a communication device having transmitted the first frame the check result of which represents failure and the communication device specified in the first information.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

(First Embodiment)

Figure 1:
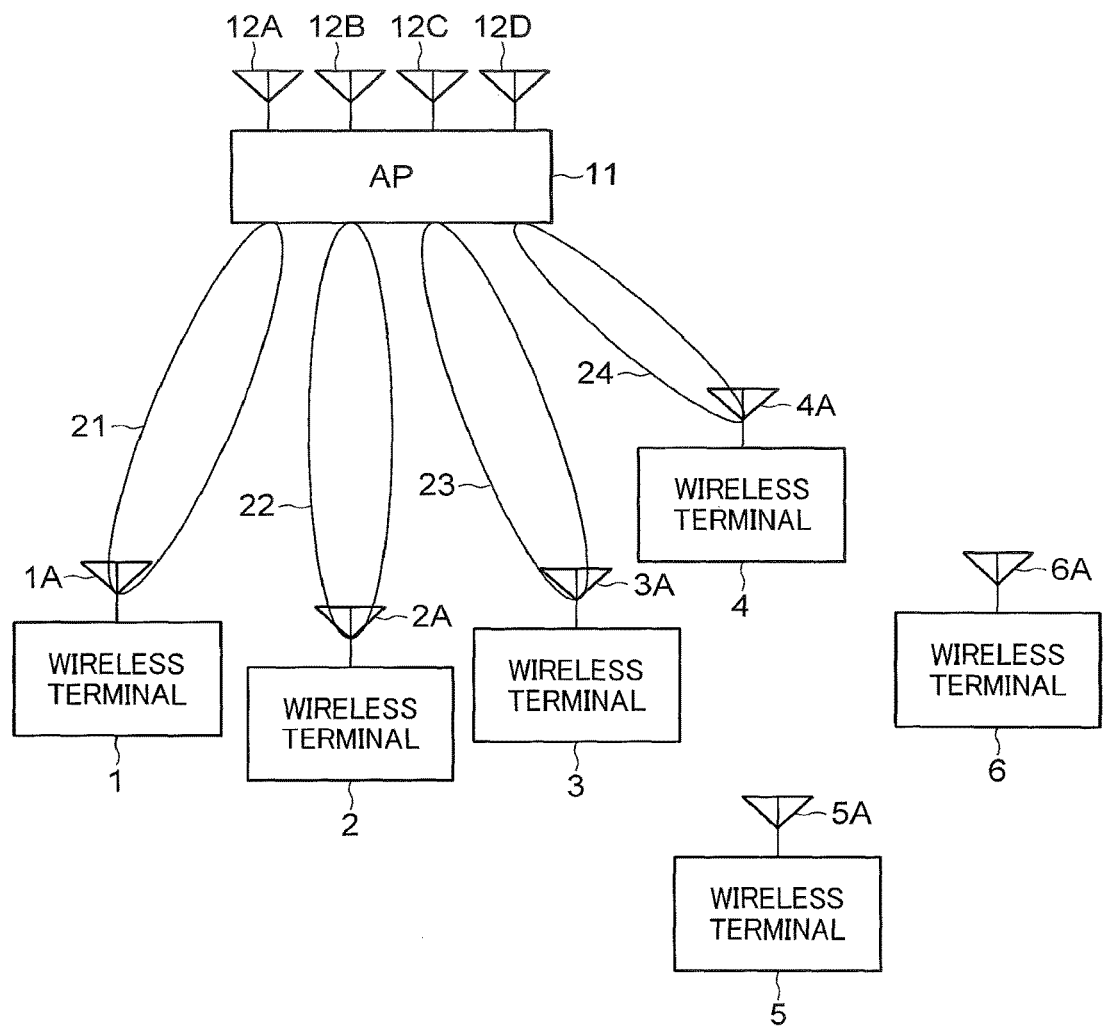
FIG. 1 is a diagram showing a wireless communication system according to a first embodiment.

FIG. 1 is a diagram showing a wireless communication system according to a first embodiment.

The wireless communication system in FIG. 1 is a wireless network which includes an access point (AP) 11 and a plurality of wireless terminals (stations) 1, 2, 3, 4, 5, and 6. The access point 11 is also one form of a wireless terminal. The access point 11 establishes a wireless link with each of the wireless terminals 1 to 6 in accordance with any wireless communication scheme to perform wireless communication. As one example, the access point 11 establishes the wireless link with each of the wireless terminals 1 to 6 in accordance with the IEEE802.11 standard to perform the wireless communication. The following description mainly describes the wireless LAN based on the IEEE802.11 standard, but the embodiment is not limited to this.

The access point 11 includes a plurality of antennas. In the example in FIG. 1, the access point 11 includes four antennas 12A, 12B, 12C, and 12D. The access point 11 have a wireless communication device installed therein (see FIG. 7 described later). The wireless communication device includes a wireless communicator and a communication control device controlling communication with the plural wireless terminals which are plural communication devices.

Each of the wireless terminals 1 to 6 includes one or more antennas. In the example in FIG. 1, each of the wireless terminals 1 to 6 includes one antenna 1A, 2A, 3A, 4A, 5A, or 6A, respectively. Each wireless terminal has a wireless communication device installed therein (see FIG. 8 described later). The wireless communication device includes a wireless communicator and a communication control device controlling communication with the access point 11 which is a communication device.

The access point 11 forms a wireless network (referred to as first network) with the wireless terminals. The access point 11 may also be connected with another network (referred to as second network) which may be wired, wireless, or a hybrid of these, separately from the first network. The access point 11 relays the communication between the first network and the second network or between the wireless terminals. A data frame occurring in each of the wireless terminals 1 to 6 is transmitted by way of the wireless communication to the access point 11, and the data frame is transmitted to other wireless terminals in the first network or the second network in accordance with a destination of the data frame. Note that the frame in the embodiment may be not only those called a frame in the IEEE802.11 standard, for example, but also those called a packet.

When the data frames occurring in the wireless terminals are transmitted to the access point 11, the transmission is performed by the spatial multiplexing. The transmission by the spatial multiplexing means that plural data streams are transmitted at the same time in the same frequency band. Specifically, plural wireless terminals (e.g., wireless terminals 1 to 4) of the wireless terminals 1 to 6 each subject the data frame to be transmitted to the access point 11 to the uplink multiuser MIMO. The uplink multiuser MIMO transmission allows the plural wireless terminals to simultaneously transmit the data frame, improving the throughput.

FIG. 1 is an example in which the number of the data streams capable of simultaneously being transmitted to the access point 11 is four, and the wireless terminals 1 to 4 of the wireless terminals 1 to 6 perform the uplink multiuser MIMO transmission. In this case, the number of the data streams capable of simultaneously being transmitted and the number of the wireless terminals, both of which are four, coincide with each other, but the embodiment is not limited thereto. For example, the number of the data streams capable of being transmitted may be four and the number of the wireless terminals simultaneously communicate may be three. In this case, one of three wireless terminals may include plural antennas, and the one wireless terminal including the plural antennas may perform the MIMO transmission of two streams to the access point 11. A combination of wireless terminals performing the uplink multiuser MIMO transmission is not limited to the wireless terminals 1 to 4, and various combinations may be set from among the wireless terminals 1 to 6. Note that in FIG. 1 other wireless terminals than the wireless terminals 1 to 6 may also exist which establish the wireless link with the access point 11.

In the uplink multiuser MIMO transmission, the number of the data streams capable of simultaneously being transmitted to the access point 11 is limited by the number of the antennas included in the access point 11 or the like. Therefore, each wireless terminal needs to grasp in advance whether or not the wireless terminal may transmit. Additionally, the wireless terminals transmitting the data frames need to synchronize in a transmission timing in some way.

For this reason, in the uplink multiuser MIMO, the access point 11 transmits in advance, to the wireless terminals belonging to the first network, a notification frame containing notification information which includes information for identifying the wireless terminals to be authorized (or permitted) to perform the uplink multiuser MIMO transmission (authorized terminal information). The authorized terminal information may be arbitrary information so long as it can identify the group of wireless terminals to be authorized to perform the uplink multiuser MIMO transmission, and may include, for example, identification information for the group of wireless terminals to be authorized. The notification information may also include various pieces of information other than the authorized terminal information which are required for performing the uplink multiuser MIMO transmission (e.g., information on a preamble transmission method described later, or the like). This notification frame is also a trigger for the wireless terminals to synchronize in the transmission timing for performing the uplink multiuser MIMO transmission. In the embodiment, one notification frame is made to act as both a frame notifying the authorized terminal information and a frame as a trigger for synchronization in the transmission timing, but these frames may be configured to be separately transmitted.

In order to achieve the uplink multiuser MIMO transmission, first, the access point 11 selects the plural wireless terminals to be authorized to perform the uplink multiuser MIMO transmission. Any method of selecting the wireless terminals may be used. For example, considered are a method of selecting from among the wireless terminals which have requested the transmission in advance, a method of sequentially selecting in round-robin fashion from among the wireless terminals which have established the wireless link, and the like. However, the number of the wireless terminals selected at one time is equal to or less than the number of the antennas included in the access point 11.

Then, the access point 11 transmits the notification frame containing the authorized terminal information specifying the selected plural wireless terminals from any one antenna in order to authorize the selected wireless terminals to perform the uplink multiuser MIMO transmission. Note that the access point 11 may also transmit the notification frames from the plural antennas. Transmission of the notification frame is performed by way of a broadcast, as an example. However, the notification frame may be transmitted by a method other than broadcasting, such as a multicast or unicast where the wireless terminals to be authorized are included. A notification frame 71 is constituted by a control frame defined by the IEEE802.11 standard, for example.

Note that the access point 11 performs carrier sense on the basis of the CSMA/CA to acquire a transmission right before transmitting the notification frame. The transmission right is acquired with a carrier sense result being idle unless a signal above a certain level is received during the carrier sense. If a signal above a certain level is received during the carrier sense, the transmission right is not acquired with the carrier sense result being busy. In this case, the carrier sense may be performed again after a back-off time elapses.

Figure 2:
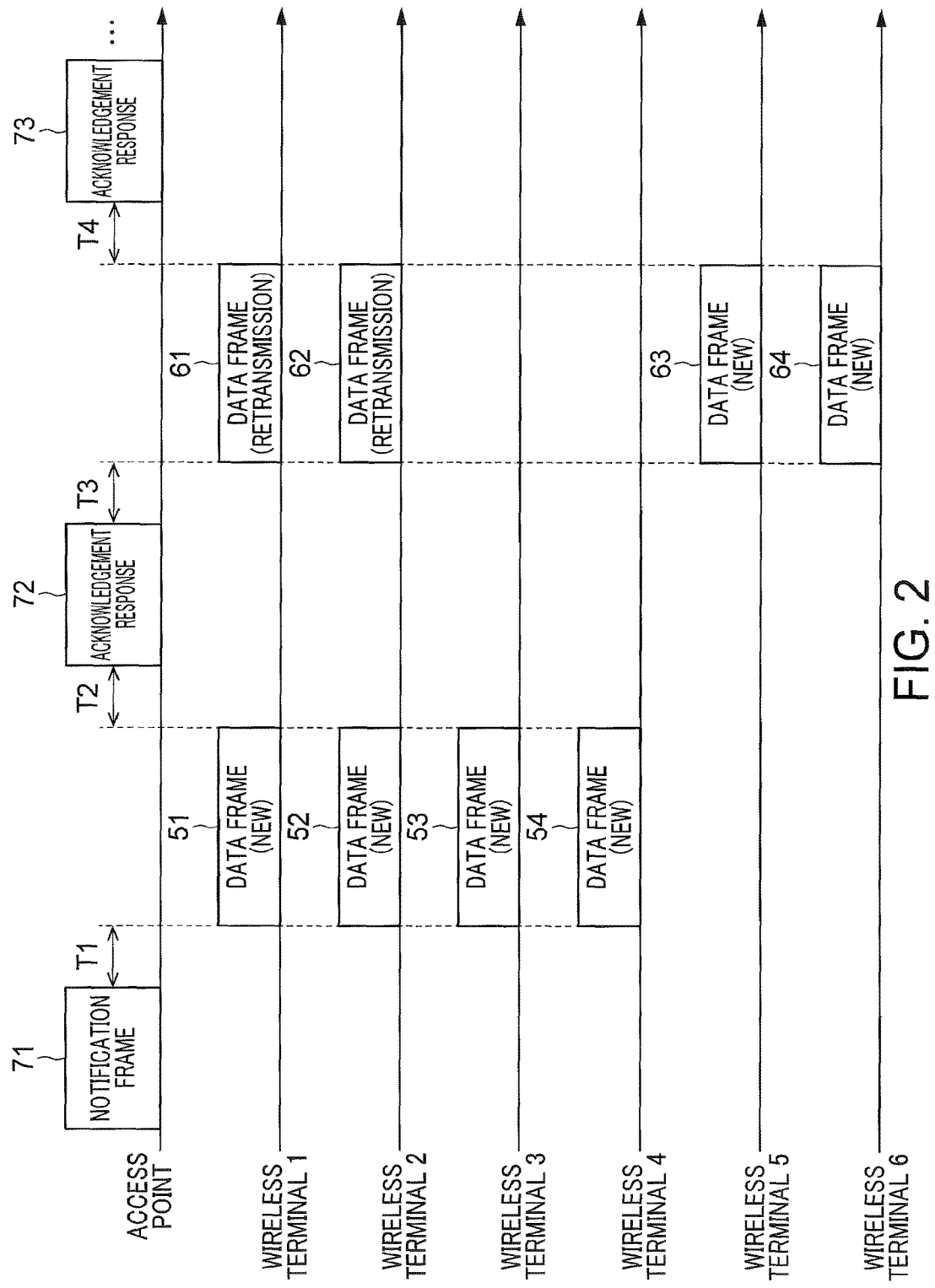
FIG. 2 is a diagram illustrating an outline of uplink multiuser MIMO transmission according to the first embodiment.

FIG. 2 shows a sequence diagram illustrating an outline of the uplink multiuser MIMO transmission according to the first embodiment. An example in FIG. 2 shows a case where the access point 11 selects the wireless terminals 1 to 4 and transmits the notification frame 71. Each of the wireless terminals 1 to 6 receives the notification frame 71 transmitted from the access point 11. The wireless terminals 1 to 6 analyze the authorized terminal information in the notification frame 71 to confirm whether or not they are specified as those to perform the uplink multiuser MIMO transmission. As a result of this, the wireless terminals 1 to 4 recognize that they are specified as those to perform the uplink multiuser MIMO transmission. On the other hand, the wireless terminals 5 to 6 recognize that they are not specified as those to perform the uplink multiuser MIMO transmission.

The wireless terminals 1 to 4 specified as those to perform the uplink multiuser MIMO transmission, after elapse of a predetermined time period T1 from receiving the notification frame 71, respectively transmit data frames 51 to 54 held in their buffers to the access point 11 at the same frequency band as shown in FIG. 2. In other words, the wireless terminals transmit the data frames by way of the spatial multiplexed uplink multiuser MIMO. The predetermined time period T1 may have any value so long as it is a predetermined time period. As an example, an SIFS (Short Inter-frame Space) time (=16 μs) may be used that is a time interval between the frames defined by the MAC protocol specification for IEEE802.11 wireless LAN. Note that the plural data frames 51 to 54 represent plural first frames transmitted from the wireless terminals, and the first frames transmitted from the wireless terminals may be different from or the same as each other. In a case where an expression that plural Xth frames are transmitted or received from the wireless terminals as a general expression, these Xth frames may be different from or the same as each other. "X" may be set to any value as necessary.

The method may not be used in which the wireless terminals 1 to 4 transmit the data frames after elapse of the predetermined time period T1 grasped in advance from receiving the notification frame, but the notification frame may have the timing described therein at which each wireless terminal is to transmit the data frame. This timing information is information identifying a time period for waiting from receiving the notification frame, which is defined by the access point 11 in advance and described in the notification frame. In this case, the wireless terminals grasp the transmission timing for the data frame by receiving the notification frame, and transmit the data frames held in their buffers at the specified timing. In the case of this method, as the transmission timing specified in the notification frame, a time elapsed after receiving notification frame may be notified, and a timestamp time shared between the wireless terminal and the access point may be notified.

In any of the methods, the wireless terminals 1 to 4 can synchronize in the transmission timing, and thus, can transmit the data frames at the same timing. That is, the uplink multiuser MIMO transmission can be performed.

The data frames of the wireless terminals transmitted by way of the uplink multiuser MIMO are received at the access point 11 as signals overlapped one another. For this reason, the access point 11 needs to spatially separate these signals. Specifically, the access point 11 uses a preamble added to a head of the data frame transmitted from each wireless terminal to estimate a channel response (a state of radio propagation path) of the uplink from each wireless terminal to the access point 11. The preamble is constituted by a known bit string used for the channel estimation. The access point 11 uses the estimated uplink channel response to correctly spatially separate a field (e.g., data field) which is subsequent to the preamble of the data frame received from each wireless terminal. This may be made by used of well-known measure, for example, any method such as a ZF (Zero-Forcing) method, or an MMSE (Minimum Mean Square Error) method, a maximum likelihood estimation method, or the like. A preamble field is arranged in a physical header (PHY header) arranged on a head side of a MAC frame, as an example.

Here, when the access point 11 uses the preambles in the data frames transmitted from the wireless terminals to estimate the channel responses, at least the preambles need to be transmitted in a form of being orthogonal to each other between the wireless terminals (non-spatially). If the preambles are not orthogonal to each other, the access point 11 may receive the preambles involving interference from the wireless terminals to be incapable of correctly estimating the channel. In this case, the fields subsequent to the preamble cannot be spatially separated (orthogonalized). The orthogonal preambles allow the access point 11 to correctly recognize the preambles of the wireless terminals. The access point 11 uses those to be able to estimate the channels between the wireless terminals and the access point 11.

For orthogonalizing the preambles in the data frames transmitted from the wireless terminals, any method in terms of temporal, frequency, or code may be used. In a case of a temporal orthogonality, since the wireless terminals sequentially transmit the preambles, only any of wireless terminals may transmit the preamble at some point in time. In a case of a frequency orthogonality, the wireless terminals use frequencies different from each other to transmit the preambles. In a case of the code orthogonality, the wireless terminals transmit the preambles in a coding pattern using rows different from each other (or columns different from each other) in an orthogonal matrix. The rows (or the columns) in the orthogonal matrix are orthogonal to each other. In any of the orthogonalization methods, the access point 11 can identify the preambles of the wireless terminals. Which of the preamble orthogonalization methods is used may be decided in advance in the system.

In addition, in order to make the preambles which are transmitted from the wireless terminal be orthogonal to each other, the wireless terminals need to be given information on the preamble transmission method. Specifically, there are required the information on at which different temporal timing the preambles are transmitted in the case of the temporal orthogonality, the information on at which different frequency the preambles are transmitted in the case of the frequency orthogonality, and the information on in which different coding pattern (which row or column pattern in the orthogonal matrix) the preambles are transmitted in the case of the code orthogonality. For example, assume a case where two or more wireless terminals transmit the preambles at the same frequency in the case of the frequency orthogonality. In this case, since the preambles are not orthogonal to each other, the access point 11 cannot correctly estimate the channels with the wireless terminals transmitting these preambles. This information may be notified to the wireless terminals to be authorized to perform the uplink multiuser MIMO transmission by the access point 11 by use of the notification frame. Alternatively, this information may be given to the wireless terminals through notification by other method than this.

Regardless of which method to use, the wireless terminals, when performing the data transmission by way of the uplink multiuser MIMO, can grasp the preambles to be transmitted or the preamble transmission method, or the both of these in some way. The wireless terminals are capable of the data transmission with the preambles orthogonal to each other by transmitting the preambles grasped in the method grasped in advance.

Note that the frame transmitted from each wireless terminal may be a data frame defined by the IEEE802.11 standard (Data Frame), for example. In this case, a data frame structure has a general MAC frame structure, and may be a frame constituted by, for example, a Frame Control field, a Duration field, an RA (Receiver Address) field, a TA (Transmitter Address) field, a Frame Body field, an FCS (Frame Check Sequence) field, and the like. In this case, the data to be transmitted is stored in the Frame Body field. A MAC address of the access point is stored in the RA field, and a MAC address of the wireless terminal is stored in the TA field. The MAC address of the access point set in the TA field may be that set in the TA field of the notification frame (see FIG. 3).

FIG. 3 shows an example of the frame format for the notification frame. For example, the frame includes a Frame Control field, a Duration field, a RA field, a TA field, a common information field, a terminal information field, and a FCS field.

The Frame Control field is set to information indicating a frame type or the like.

The Duration field is set to a time set as a virtual carrier sense. The device receiving the frame in which the Duration field is set to a value counts down until the time set in this field becomes zero, recognizing as being busy until becoming zero. This is called the virtual carrier sense.

The RA (Receiver Address) field is usually set to a MAC address of a destination (destination of transmission) for the frame. Since the notification frame is transmitted to the plural wireless terminals, the RA field may be set to a broadcast address. However, as the RA, not the broadcast address but a multicast address including the wireless terminals to be authorized or the MAC address (unicast address) of the wireless terminal may be set. If the unicast address is set, the plural RA fields may be provided to specify plural destinations. In this case, setting of the plural destinations may be defined in the Frame Control field.

The TA (Transmitter Address) field contains a MAC address of an originating frame. In the case of the notification frame, the TA field is set to the MAC address of the access point.

The common information field is set to information to be commonly notified to the wireless terminals to be authorized to perform the uplink multiuser MIMO transmission as the information required for performing the uplink multiuser MIMO transmission. For example, if the notification frame is used to specify the transmission timing with respect to the selected wireless terminals to perform the uplink multiuser MIMO transmission, the common information field is set to the transmission timing. If the data transmission is performed after elapse of the predetermined time period T1 from receiving the notification frame, a value of T1 is known by the wireless terminal, and thus, the notification of the transmission timing is not necessary. In addition, as described later, the number of the terminal information fields varies, and thus, the number of the terminal information fields may be set in the common information field. A data frame length or a time length permitted in uplink multiuser MIMO transmission, or the both of these may be set in the common information field.

The terminal information field (individual information field) is provided for each of the wireless terminal to be authorized to perform the uplink multiuser MIMO transmission. The number of the terminal information fields varies depending on the number of the wireless terminals to be authorized to perform the uplink multiuser MIMO. In the example in FIG. 2, four terminal information fields are provided. In other words, there are provided a terminal information field 1, a terminal information field 2, a terminal information field 3, and a terminal information field 4.

The terminal information field contains the identification information for the wireless terminals specified as those to perform the uplink multiuser MIMO transmission, and individual information (e.g., the preamble transmission method, as described later) unique to the specified wireless terminals as the information which the wireless terminals require for performing the uplink multiuser MIMO transmission. As a modification example, the identification information for the wireless terminals specified as those to perform the uplink multiuser MIMO transmission may be considered to be set not in the respective terminal information fields but in the common information field. The identification information for the wireless terminal is not limited to a special one so long as it can identify the wireless terminal. For example, there can be used the MAC address or an Association ID (AID), or the both of these, and besides, some ID capable of identifying the terminal.

Figure 4:
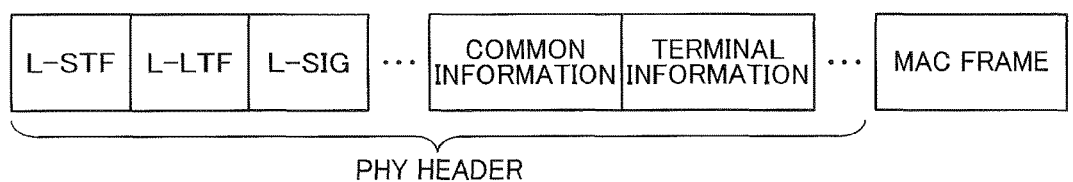
FIG. 4 is a diagram showing another example of the frame format for the notification frame.

The terminal information fields and common information field in the notification frame shown in FIG. 3 may be arranged in a MAC header of the MAC frame or in a frame body. Here, a case is shown where the terminal information field and common information field are set in the MAC frame, but the terminal information field and the common information field may be set in the physical header (PHY header) which is added on the head side of the MAC frame as shown in FIG. 4 The PHY header includes an L-STF (Legacy-Short Training Field), an L-LTF (Legacy-Long Training Field), an L-SIG (Legacy Signal Field), a common information field, and a terminal information field. The L-STF, the L-LTF, and the L-SIG, which each are a field capable of being recognized by a legacy standard such as the IEEE802.11a, for example, have stored therein information such as on signal detection, frequency correction, and transmission rate. In the following description, assumed a case where the notification frame has a format as shown in FIG. 3.

The wireless terminals receive the notification frame having the format as shown in FIG. 3, and can grasp that they are specified as those to perform the uplink multiuser MIMO transmission if the identification information for them are contained in any of the terminal information fields (or the common information field or both of the terminal information field and the common information field). In the example of FIG. 2, the terminal information fields 1 to 4 are set to the identification information for the wireless terminals 1 to 4, respectively.

If the preamble transmission method when the wireless terminals perform the data transmission by way of the uplink multiuser MIMO is notified by use of the notification frame, each terminal information field is set to the preamble transmission method each wireless terminal to execute (at least one or more of temporal timing, frequency, and orthogonal matrix coding pattern). Each wireless terminal transmits data frame in accordance with the preamble transmission method specified in the terminal information field containing the identification information for the self-terminal. This allows the preambles in the data frames transmitted by the wireless terminals to be transmitted in a form of being orthogonal to each other.

Examples of the method for specifying the wireless terminals specified as those to perform the uplink multiuser MIMO transmission may include, in addition to the method in which the terminal information fields are set to the identification information for the wireless terminals specified as those to perform the uplink multiuser MIMO transmission, a method in which a group number is notified as described below.

The access point 11 groups in advance the plural wireless terminals establishing the wireless link into various combinations of wireless terminals to perform the uplink multiuser MIMO transmission. For example, there may be a combination of the wireless terminals 1, 2, 3 and 4 as a group 1, a combination of the wireless terminals 1, 3 and 4 as a group 2, and a combination of the wireless terminals 1, 2, 4 and 5 as a group 3. The number of kinds of the group is arbitrary, and one wireless terminal may belong to the plural groups.

The access point 11 notifies a grouping result to the wireless terminals using a special frame, which allows the wireless terminals to grasp in advance to which group number they belong. The access point 11 may adequately add a new group and may change the combination of the wireless terminals belonging to existing groups. The access point 11, every time adding or changing the group or the both, notifies that using the special frame.

At this time, the preamble transmission methods for the grouped wireless terminals may be notified. In this case, the preamble transmission method for transmitting the preambles in a form of being orthogonal to each other is notified to each of the wireless terminals belonging to the same group.

Each wireless terminal grasps in advance which group number it belongs to and how to transmit the preamble for each group number it belongs to. For this reason, the access point 11 may only notify the group number corresponding to the combination of the wireless terminals desired to be authorized to perform the uplink multiuser MIMO by use of the notification frame to allow the wireless terminals to be specified which are to be authorized to perform the uplink multiuser MIMO transmission. In the case of notification of the group number by use of the notification frame, for example, the common information field is set to the group number.

The wireless terminals receive the notification frame, and, if the group number set in the common information field is the group number to which they belong, recognize that they are specified as those to perform the uplink multiuser MIMO transmission.

The FCS (Frame Checkسequence) field is set to FCS information in the notification frame 71. The FCS information is used for detecting a frame error on a reception device side.

Next, a description is given of a method for the acknowledgement response by the access point 11 to the wireless terminals with respect to the data frames transmitted from the wireless terminals by way of the uplink multiuser MIMO transmission.

The access point 11 receives the data frames from the plural wireless terminals by way of the uplink multiuser MIMO transmission, and thereafter, checks a CRC (cyclic redundancy code) using the FCS fields of the received data frames. This confirms whether or not the data frames from the wireless terminals can be correctly received without errors. The access point 11 creates one acknowledgement response frame containing results of error detection in the received data frames.

At this time, the access point 11 can contain in the acknowledgement response frame the notification information which specifies the wireless terminals to be authorized to perform the uplink multiuser MIMO transmission of a new data frame, as necessary. The new data frame is a data frame other than the data frame transmitted through the last data transmission (e.g., the data frames 51 to 54 in FIG. 2). The notification information may contain information on the preamble transmission methods to be used by the specified wireless terminals.

Hereinafter, in some cases, the acknowledgement response frame not containing the notification information is called a usual acknowledgement response frame and the acknowledgement response frame containing the notification information is called an acknowledgement response frame with notification function for the purpose of distinction.

Figure 5:
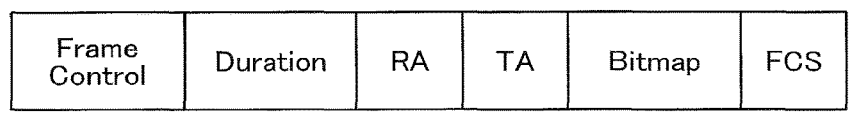
FIG. 5 is a diagram showing an example of a frame format for a usual acknowledgement response frame according to the first embodiment.

FIG. 5 shows an example of a frame format for the usual acknowledgement response frame. This frame format includes, for example, a Frame Control field, a Duration field, a RA field, a TA field, a Bitmap field, and an FCS field.

Since the acknowledgement response frame is transmitted to the plural wireless terminals, the RA field is set to the broadcast address as an example. However, in the case of the multicast transmission, the RA field may be set to the multicast address including the wireless terminals to be authorized. Alternatively, the RA field may be set to the MAC address (unicast address) of one wireless terminal of the wireless terminals to which the acknowledgement response is transmitted. In this case, the wireless terminal stores in advance the information on other wireless terminals specified by use of the notification frame 71 than the self-terminal, and, if this RA field is set to the address(es) of the other wireless terminal(s), interprets this acknowledgement response frame to be also directed to itself.

The Frame Control field, the Duration field, the TA field, and the FCS field are similar to the notification frame, whose descriptions are omitted.

The Bitmap field is a field reflecting the CRC results of the data frames received from the wireless terminals by way of the uplink multiuser MIMO. Specifically, one bit in the bitmap indicates the CRC result of the received data frame. Each bit is set to "1" if CRC=OK (reception is succeeded) or "0" if CRC=NG (reception is failed). A case where "1" and "0" are inverted to each other may be acceptable. This allows that each wireless terminal receiving the acknowledgement response frame by referring to the Bitmap field can grasp a result of transmission of the data frame the wireless terminal has transmitted. Which wireless terminal check result is mapped in which bit in the bitmap may be specified in the common information field of the notification frame in advance, may be notified in advance by use of another frame different from the notification frame, or may be specified by other method than these.

FIG. 6 shows an example of a frame format for the acknowledgement response frame with notification function. The format in FIG. 6 is obtained by adding the common information field and a terminal information 1 field to a terminal information n ("n" is an integer not less than "1") field between the Bitmap field and the FCS field of the usual acknowledgement response frame shown in FIG. 5.

The added field having the same name as the field contained in the format for the notification frame shown in FIG. 3 basically serves as the same function. By using these added fields (i.e., the common information field and the terminal information fields), the access point 11 specifies, in the acknowledgement response frame, the wireless terminals to be authorized to perform the uplink multiuser MIMO transmission of the new data frame.

Specifically, the access point 11 specifies, in the common information field or the terminal information fields (individual information fields), or the both of these in FIG. 6, the wireless terminals to be authorized to transmit the new data frame, similarly to the notification frame. For example, the terminal information fields are set to the identification information for the wireless terminals specified as those to perform the uplink multiuser MIMO transmission, and individual information unique to them as the information required for performing the uplink multiuser MIMO transmission. Note that the information on the wireless terminals to be authorized to transmit the new data frame may be stored in the PHY header (see FIG. 4).

Examples of the wireless terminals specified by use of the acknowledgement response frame with notification function include the wireless terminal succeeding in the check result or the wireless terminal establishing the wireless link (e.g., wireless terminals 5 and 6) other than the wireless terminal previously having transmitted the data frame (wireless terminal having subjected to the CRC check), or the both of these. The maximum number of wireless terminals capable of being specified is "the maximum number of the wireless terminals capable of multiplexing—the number of the wireless terminals performing retransmission based on the CRC result". In other words, this is a value obtained by subtracting the number of the terminals of which the check results are failures from the maximum number of the terminals to which the access point 11 capable of multiplexing transmission. This is because specifying the more number of the wireless terminals capable of multiplexing causes a separation capacity of the access point 11 to be exceeded. For this reason, in the case of specifying the wireless terminal in the terminal information field, the maximum number of the terminal information fields may exist.

Note that in a case of the wireless terminal capable of transmitting the plural data streams (MIMO transmission) each of which data streams is capable of transmitting the different data frame, the wireless terminal may be specified as a wireless terminal to be authorized to transmit the new data frame even if the check result is a failure. For example, it is a case where the check result of one data frame is a failure and the check result of the other data frame is a success.

Additionally, the access point 11 may be configured to specify the wireless terminal by setting the common information field of the acknowledgement response frame to the group number described above. In this case, the group number is set to a grouping number numbering a combination of the wireless terminals needing the retransmission and the wireless terminals to be authorized to transmit the new data frame, as an example. In this case, the wireless terminal having transmitted the data frame, if it belongs to the group of the group number, can determine to retransmit the data frame because of the failed CRC result. This causes the Bitmap field to be unnecessary. On the other hand, the wireless terminal not belonging to the group can determine that the check result is a success. In the case of this configuration, the wireless terminal specified by use of the group number as one to be authorized to transmit new data frame is, of the wireless terminals establishing the wireless link with the access point 11, the wireless terminal not having transmitted data frame last time (wireless terminal not having subjected to the CRC check).

Alternatively, as another method, a configuration may be used in which the wireless terminals needing the retransmission can grasp, by the Bitmap field or the like, having to do the retransmission, and thus, the common information field is set to the grouping number numbering a combination of only the wireless terminals to be authorized to transmit the new data frame.

The acknowledgement response frame with notification function shown, in the example of FIG. 6 may be defined as a "acknowledgement response frame" as a frame type, or as a different frame name such as a "acknowledgement response+Poll frame", for example. In the case of the former, the common information field or the terminal information field, or the both of these are added to the usual frame format in FIG. 5, as necessary.

In the case of the latter, the format in FIG. 5 and the format in FIG. 6 may be defined as the frame type in the Frame Control field. In this case, the wireless terminals confirm the Frame Control field to determine to receive the frame in either format in FIG. 5 or FIG. 6. As an example, if the wireless terminal other than the wireless terminal subjected to the check receives the acknowledgement response frame, in the case of the frame type "acknowledgement response +Poll frame", it refers the common information field or the terminal information field to confirm whether or not it is specified as a terminal given a transmission authorization. In the case of the frame type "acknowledgement response frame", since the terminal can grasp information for specifying the terminal not being contained, it may ignore the frame.

The access point 11 can simultaneously transmit the acknowledgement response (retransmission request) to the wireless terminals which has performed the transmission most recently and specify the wireless terminals to transmit the new data frame, by transmitting the acknowledgement response frame in the format in FIG. 6. Therefore, the acknowledgement response frame in the format shown in FIG. 6 can be said to be a frame capable of acting as two roles of transmitting the acknowledgement response to the wireless terminals having performed the transmission most recently and specifying the wireless terminals to be authorized to transmit the new data frame.

The access point 11 may decide in any way which format of the acknowledgement response frame is generated. For example, the usual format may be used if the check results for the all wireless terminals are failures in the reception, and in other cases, that is, if the check results for one or more wireless terminals are successes, the format with notification function may be used. The decision may be made in other ways.

The access point 11 transmits the acknowledgement response frame generated in any format in this way after elapse of the predetermined time period T2 from receiving the data frames (see FIG. 2).

Here, the predetermined time period T2 may have any value so long as it is a predetermined time period. As an example, an SIFS (Short Inter-frame Space) time (=16 μs) may be used that is a time interval between the frames defined by the MAC protocol specification for IEEE802.11 wireless LAN.

In addition, the acknowledgement response frame may be transmitted from the access point 11 at a transmission timing not after elapse of the predetermined time period T2 but after elapse of a predefined another arbitrary time period. In this case, for example, the transmission timing is notified in advance to the wireless terminals in the notification frame or other frame, or the both of these. This allows the wireless terminals to grasp the timing for receiving the acknowledgement response frame.

Note that the access point 11 may perform, before the transmitting acknowledgement response frame, the carrier sense on the basis of the CSMA/CA to acquire the transmission right, and thereafter, transmit the acknowledgement response frame.

The wireless terminals previously having transmitted the data frames can confirm the check results for the wireless terminals included in the acknowledgement response frame to determine whether or not the access point has correctly received the data frames transmitted by them.

If the acknowledgement response frame has the usual format (see FIG. 5), the wireless terminal for which the check result represents a failure retransmits the data frame at a timing after elapse of a predefined time period T3 from receiving the acknowledgement response frame. That is, the data frames retransmitted from the plural wireless terminals are subjected to the uplink multiuser MIMO transmission. At this time, the wireless terminal for which the check result is a success and other wireless terminal (the wireless terminal other than the wireless terminal subjected to the CRC check) do not perform the transmission.

Here, the time period T3 may have any value so long as it is a predetermined time period. As an example, an SIFS (Short Inter-frame Space) time (=16 μs) may be used that is a time interval between the frames defined by the MAC protocol specification for IEEE802.11 wireless LAN. Alternatively, a field for specifying an arbitrary transmission timing may be set in the acknowledgement response frame, in which field the access point 11 may specify the transmission timing for performing the retransmission.

On the other hand, in the case of the acknowledgement response frame with notification function, the wireless terminal for which the check result is a failure retransmits the data frame at a timing after elapse of the predefined time period T3 from receiving the acknowledgement response frame, similarly to the case of the usual acknowledgement response frame. The wireless terminal for which the check result is a success and other wireless terminal (the wireless terminal not subjected to the CRC check) confirm whether or not they are specified in the acknowledgement response frame. For example, the identification information for the wireless terminals and the like are confirmed to be set in the common information field or the terminal information field, or the both of these. Whether the acknowledgement response frame has the usual format or the format with notification function may be determined based on the frame type of the Frame Control field, for example. In a case of the system having no frame type for distinguishing these formats from each other, the format being used may be determined from a length of the data included the physical header, for example. The format may be determined in other ways than those described above.

The wireless terminal specified in the acknowledgement response frame with notification function transmits the new data frame at a timing after elapse of the above time period T3 from receiving the acknowledgement response frame (the same timing as for the retransmission data frame). This allows the wireless terminal specified in the acknowledgement response frame to also perform the transmission simultaneously at the transmission timing for performing the retransmission by the wireless terminal having failed in the transmission. In other words, the wireless terminal performing the retransmission and the wireless terminal specified in the acknowledgement response frame may perform the uplink multiuser MIMO transmission. Note that if the wireless terminal transmits the plural data frames through the plural data streams (MIMO transmission), a part of the data frames may be failed in the transmission and a separate part of the data frames may be succeeded in the transmission. In this case, the wireless terminal identifies the failed data frame in the acknowledgement response frame with notification function and determines whether or not the wireless terminal is specified in the same.

If the wireless terminal is specified, it simultaneously transmits (MIMO) the data frame having failed in the transmission and the new data frame through the plural data streams. In other words, the wireless terminal performs frame transmission in at least one of the case where it fails in the data frame transmission or the case where it is specified.

In the above description, the acknowledgement response frame presents the check results by means of the Bitmap one bit which indicates the CRC result for each wireless terminal, but not limited thereto, so long as a form may be used which includes the information capable of grasping the check results for the all wireless terminals having transmitted the data frames. For example, an aggregation frame (super frame) may be transmitted in which ACK (Acknowledgement) frames are aggregated for the all wireless terminals, the ACK frame being a single acknowledgement response frame including only the check result for one wireless terminal.

The frames transmitted by the wireless terminal by way of the uplink multiuser MIMO may be an aggregation frame in which the plural data frames are aggregated. In other words, each wireless terminal may transmit the aggregation frame containing the plural data frames by way of the uplink multiuser MIMO. In this case, the acknowledgement response frame sent as a replay from the access point 11 needs to have a form capable of grasping the CRC results for the data frames in the aggregation frame of each wireless terminal. Examples of the method for reflecting the CRC results for the group of data frames in the aggregation frame may include the same method as for a Block Ack frame defined by the MAC protocol specification for IEEE802.11 wireless LAN.

Hereinafter, a specific example of an operation according to the embodiment is shown with reference to FIG. 2. As described above, the wireless terminals 1 to 4 specified to be given a transmission authorization by use of the notification frame 71 transmit the data frames 51 to 54 after elapse of the time period T1 from receiving the notification frame 71. Assume that the access point 11 can correctly receive the data frames 53 and 54 transmitted from the wireless terminal 3 and the wireless terminal 4, respectively, but cannot correctly receive the data frames 51 and 52 transmitted from the wireless terminal 1 and the wireless terminal 2, respectively.

The access point 11 decides to generate the acknowledgement response frame in the format with notification function shown in FIG. 6. The access point 11 sets the Bitmap field of the acknowledgement response frame to the information reflecting the CRC results for the data frames transmitted from the wireless terminals, as an example. Further, the notification information or the like for authorizing the wireless terminal 5 and the wireless terminal 6 to transmit the new data frame is set in the acknowledgement response frame. For example, the terminal information 1 field and the terminal information 2 field of the acknowledgement response frame are set to the identification information for the wireless terminal 5 and the wireless terminal 6 and the individual information for the wireless terminals 5 and 6 (e.g., preamble transmission method or the like). The common information field may be set to the information such as the number of the terminal information fields or the frame length. The access point 11 transmits an acknowledgement response frame 72 set like this. The transmitted acknowledgement response frame 72 is received by the wireless terminals 1 to 4 as well as the wireless terminals 5 and 6 having established the wireless link with the access point 11.

Of the wireless terminals 1 to 6 receiving the acknowledgement response frame 72, the wireless terminals 1 to 4 determine whether or not the data frames transmitted from them are correctly received on the basis of the information in the Bitmap field. The wireless terminal 1 and the wireless terminal 2 determine that the data frames transmitted from them are not correctly received, and then, performs a process for retransmitting data frames 61 and 62 at a predetermined retransmission timing. The retransmission timing means, for example, a time after elapse of the predetermined time period T3 from receiving the acknowledgement response frame, or a time after elapse of an arbitrary time period specified in the acknowledgement response frame, or the like.

The wireless terminal 3 and the wireless terminal 4 determine that the data frames transmitted from them are correctly received by the access point, and then, end the transmission process.

On the other hand, the wireless terminal 5 and the wireless terminal 6, when receiving the acknowledgement response frame, determine whether or not they are authorized to perform the uplink multiuser MIMO transmission of the new data frame on the basis of the terminal information fields or the like. Here, since the terminal information fields contain the respective identification information, the terminals determine to be given a transmission authorization. The wireless terminal 5 and the wireless terminal 6 each given the transmission authorization respectively transmit data frames 63 and 64 stored in their buffer in the methods specified in the terminal information fields for them or the like after elapse of the predefined time period T3 from receiving the acknowledgement response frame. The retransmission timing referred to here means, similarly to the above case of the retransmission timing, a time after elapse of the predetermined time period T3 from receiving the acknowledgement response frame, or a time after elapse of an arbitrary time period specified in the acknowledgement response frame, or the like.

The preambles of the frames transmitted from the wireless terminals 1, 2, 5, and 6 are arranged so as to be orthogonal to each other, which allows the access point to grasp the information on the channel responses with the wireless terminals 1, 2, 5, and 6 and correctly separate the frames received the wireless terminals 1, 2, 5, and 6, as described above.

The access point 11 receives by way of the uplink multiuser MIMO the retransmitted data frames 61 and 62 from the wireless terminals 1 and 2, and the new data frames from the wireless terminals 5 and 6. Whether or not the data frames are normally received is checked, and the acknowledgement response frame 73 is generated which contains the check results and the notification information including the authorized terminal information which, as necessary, specifies a terminal authorized to perform the new data frame transmission. The access point 11 transmits the acknowledgement response frame 73 at a time after elapse of a predefined time period T4 or after elapse of an arbitrary time period from receiving the data frames. Hereafter, the similar processes are repeated.

This allows the data frames retransmitted from the wireless terminal 1 and the wireless terminal 2 and the new data frames transmitted from the wireless terminal 5 and the wireless terminal 6 to be multiplexed and transmitted at the same timing, achieving the uplink multiuser MIMO transmission. Therefore, the user multiplexing number of the uplink multiuser MIMO can be maintained above a certain value even in the retransmission.

Figure 7:
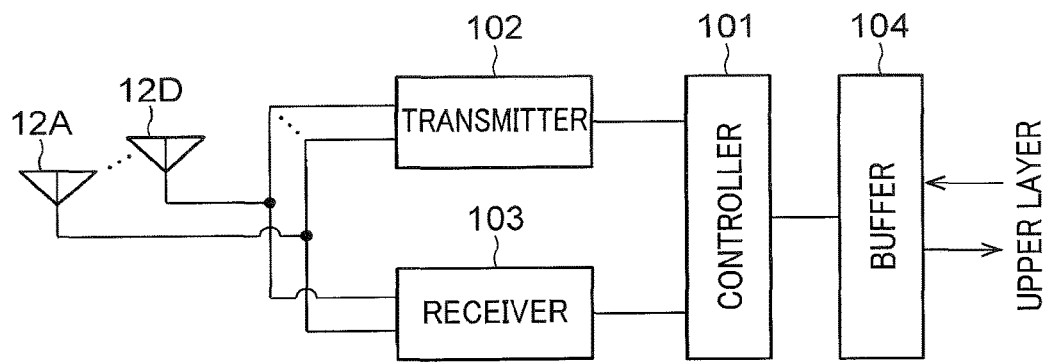
FIG. 7 is a functional block diagram of a wireless communication device installed in an access point according to the first embodiment.

FIG. 7 is a functional block diagram of the wireless communication device in the access point 11. As described above, the access point 11 may be connected the network (first network) on the wireless terminal side, and in addition to this, another network (second network) different from the former. FIG. 7 shows a configuration of the wireless communication device on the first network side.

The wireless communication device includes a controller 101, a transmitter 102, a receiver 103, antennas 12A, 12B, 12C and 12D, and a buffer 104. The controller 101 corresponds to the communication control device controlling communication with the wireless terminals, and the transmitter 102 and the receiver 103 form the wireless communicator as an example. A process of the controller 101, and all or a part of a digital region process of the transmitter 102 and receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and receiver 103, or the process of the communication control device.

The buffer 104 is a storage for transferring the data frame between an upper layer and the controller 101. The buffer 104 may be a volatile memory such as a DRAM or a non-volatile memory such as a NAND, or an MRAM. The upper layer stores the frame received from the second network in the buffer 104 for relaying to the first network, or takes in, from the controller 101, the frame received from the first network. The upper layer may perform an upper communication process than a MAC layer such as a TCP/IP or a UDP/IP. The upper layer may also perform a process of an application layer of processing the data. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer (e.g., a process concerning the MIMO or the like). The controller 101 transmits and receives the frame via the transmitter 102 and the receiver 103 to control the communication with the wireless terminals in the first network. The controller 101 may also control so as to periodically transmit a beacon frame. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the wireless terminal, establishes the wireless link with the wireless terminal through a process such as authentication, as necessary. The controller 101 periodically confirms the buffer 104. Alternatively, the controller 101 confirms the buffer 104 by an external trigger such as the buffer 104. The controller 101, on the basis of some determination, selects the plural wireless terminals to be authorized to perform the uplink multiuser MIMO transmission from among the wireless terminals establishing the wireless link, and generates the notification frame containing the authorized terminal information (notification information) for specifying these wireless terminals. The controller 101 sets the information for specifying the transmission method of the data frame for each wireless terminal (the common information, the individual information, or the both of these), as necessary, in the common information field, terminal information field or both of these of the notification frame.

The controller 101 transmits the generated notification frame from the transmitter 102 in accordance with the communication scheme of use. As an example, if the carrier sense is performed to acquire the transmission right, the controller 101 outputs the generated notification frame to the transmitter 102. The transmitter 102, which includes transmission systems corresponding to the antennas, uses a particular transmission system to subject the input notification frame to desired processes of the physical layer such as a modulation process or adding the physical header. The transmitter 102 also subjects the frame having been subjected to the process of the physical layer to a DA conversion, a filtering process extracting signal components of a desired band, and a frequency conversion (up-conversion). The transmitter 102 amplifies the signal subjected to the frequency conversion to emit as a radio wave from any one of antennas into the space. Note that a configuration may be used in which the notification frame is input to the plural transmission systems to be transmitted from the plural antennas.

The signal received by each antenna is processed in the receiver 103 for each reception system corresponding to the each antenna. For example, after transmitting the notification frame described above, the signals of the data frames sent back from the plural wireless terminals specified in the notification frame are simultaneously received by the antennas (uplink multiuser MIMO reception). The signals received by the antennas are input to the reception systems in the receiver 103. The received signals are respectively amplified in the reception systems, subjected to the frequency conversion (down-conversion) and the filtering process to extract the components of the desired band. The extracted signals are further converted into digital signals through an AD conversion and subjected to the process of the physical layer such as demodulation, and thereafter, respectively input to the controller 101.

The controller 101 performs the channel estimation on the basis of the preambles of the signals input from the reception systems to acquire a channel response matrix of the uplink. The controller 101 separates the data subsequent the preamble for each wireless terminal (each data frame) on the basis of the channel response matrix of the uplink acquired by the estimation. This allows the access point 11 to receive the data frames simultaneously transmitted from the plural wireless terminals without involving interference.

The controller 101 also controls the acknowledgement response frame to be transmitted after elapse of a predetermined time period from receiving the data frames transmitted from the wireless terminals by way of the uplink multiuser MIMO. The controller 101 subjects the data frames received from the wireless terminals to the CRC check and generates the acknowledgement response frame in which the information indicating the CRC results are stored.

Here, the acknowledgement response frame include the usual acknowledgement response frame and acknowledgement response frame with notification function, as described above. In the case of generating the acknowledgement response frame with notification function, the controller 101 selects the wireless terminals to be authorized to perform the uplink multiuser MIMO transmission and adds the authorized terminal information specifying these wireless terminals to the above acknowledgement response frame.

Examples of a method for selecting the wireless terminals include any method such as a method of selecting, of the wireless terminals establishing the wireless link, from among the wireless terminals not having subjected to the CRC check (wireless terminals not having transmitted data frame last time), from among the wireless terminals each for which the check result is a success, or from among the both of these.

The number of the selected terminals is, for example, equal to or less than a value obtained by subtracting the number of the terminals of which the check results are failures from the maximum number of the terminals to which the access point 11 capable of spatial multiplexing.

As for a form of the notification information specifying the selected wireless terminals, the identification information for the selected wireless terminals may be arranged in the common information field or the terminal information fields for the respective wireless terminals, or the both of these. Alternatively, the identification information for the group to which the selected wireless terminals commonly belong may be arranged in the common information field or the like.

Examples of the destination of the acknowledgement response frame include the broadcast address, and in addition to this, the multicast address or the unicast address of one of the wireless terminals specified in the notification frame (wireless terminals having transmitted the data frames) in some methods.

The transmitter 102 inputs the generated acknowledgement response frame to one of the plural transmission systems. The transmission system to which the acknowledgement response frame is input modulates the input acknowledgement response frame and subjects the modulated signal to the process of the physical layer such as adding the physical header. The transmitter 102 also subjects the frame having been subjected to the process of the physical layer to the DA conversion, the filtering process extracting signal components of a desired band, and the frequency conversion (up-conversion). The transmitter 102 amplifies the signal subjected to the frequency conversion to emit as a radio wave from any one of antennas into the space. Note that a configuration may be used in which the acknowledgement response frame is input to the plural transmission systems to be transmitted from the plural antennas.

The controller 101 may access a storage for storing the information to be transmitted to the wireless terminals or the information received from the wireless terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and transmitter 102 is an example, and another form may be used. For example, the controller 101 may perform the process until the digital region process, and the transmitter 102 may perform the DA conversion and the subsequent processes. As for the isolation of the processes of the controller 101 and receiver 103, similarly, the receiver 103 may perform the process until the AD conversion and the controller 101 may perform the digital region process including the subsequent process of the physical layer. Isolation other than those described above may be used.

Figure 8:
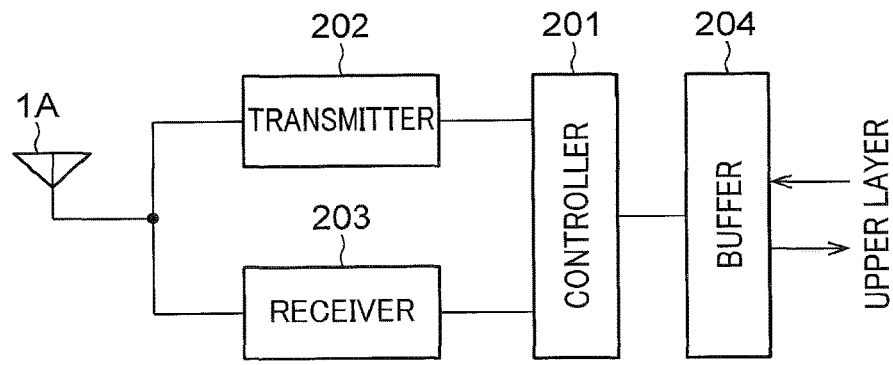
FIG. 8 is a functional block diagram of a wireless communication device installed in a wireless terminal according to the first embodiment.

FIG. 8 is a functional block diagram of the wireless communication device installed in the wireless terminal 1. The wireless communication devices installed in the wireless terminals 2 to 6 have the same configuration as the wireless terminal 1, and therefore, the description of the wireless terminal 1 is substituted for the description of the wireless terminals 2 to 6 in the following description.

The wireless communication device includes a controller 201, a transmitter 202, a receiver 203, an antenna 1A, and a buffer 204. The controller 201 corresponds to the communication control device controlling communication with the access point 11, and the transmitter 202 and the receiver 203 form the wireless communicator as an example. A process of the controller 201, and all or a part of a digital region process of the transmitter 202 and receiver 203, or a process of the communication control device may be performed by software (program) executing on a processor such as a CPU, or may be performed by hardware, or may be performed by the both of the software and the hardware. The plural antennas may be provided other than the antenna 1A. The wireless terminal may use the plural antennas to perform the MIMO transmission of the plural data frames. The wireless terminal may include a processor performing the process of the controller 201, all or a part of the transmitter 202 and receiver 103, or the process of the communication control device.

The buffer 204 is a storage for transferring the data frame between an upper layer and the controller 201. The buffer 204 may be a volatile memory such as a DRAM or a non-volatile memory such as a NAND, or an MRAM. The upper layer generates the frames to be transmitted to other wireless terminals, the access point 11, or a device on another network such as a server and stores the generated frames in the buffer 204, or takes in, via the buffer 204, the frames received in the first network. The upper layer may perform an upper communication process than a MAC layer such as a TCP/IP or a UDP/IP. The upper layer may also perform a process of an application layer of processing the data. A process of the upper layer may be performed by software (program) executing on a processor such as a CPU, or may be performed by hardware, or may be performed by the both of these software and hardware.

The controller 201 mainly perform a process of the MAC layer. The controller 201 transmits and receives the frames via the transmitter 202 and the receiver 203 to and from the access point 11 to control the communication with the access point 11. The controller 201 receives via the antenna 1A and the receiver 203 a beacon frame periodically transmitted from the access point 11, for example. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, transmits an association request to the access point 11 in response to the received beacon, and establishes the wireless link with the access point 11 through a process such as authentication, as necessary. The controller 201 periodically confirms the buffer 204. Alternatively, the controller 201 confirms the buffer 204 by an external trigger such as the buffer 204. The controller 201, after confirming there are the frames to be transmitted to the access point 11, reads out the frames and transmits via the transmitter 202 and the antenna 1A in accordance with the communication scheme of use. Alternatively, in response to receiving from the access point 11 at least one of the notification frame or the acknowledgement response frame (the usual acknowledgement response frame or the acknowledgement response frame with notification function), the controller 201 reads out the frames at a timing when the self-terminal is given a transmission authorization of the uplink multiuser MIMO or the retransmission timing and transmits the read frames via the transmitter 202 and the antenna 1A in accordance with communication scheme of use.

The transmitter 202 subjects the frames input from the controller 201 to desired processes of the physical layer such as a modulation process or adding the physical header. The transmitter 202 also subjects the frame having been subjected to the process of the physical layer to the DA conversion, the filtering process extracting signal components of a desired band, and a frequency conversion (up-conversion). The transmitter 202 amplifies the signal subjected to the frequency conversion to emit as a radio wave from the antenna into the space.

The signal received by the antenna 1A is processed in the receiver 203. For example, the signal of the notification frame is received from the access point 11 and processed in the receiver 203. The received signal is amplified in the receiver 203, subjected to the frequency conversion (down-conversion) and the filtering process to extract the components of the desired band. The extracted signals are further converted into digital signals through an AD conversion and subjected to the process of the physical layer such as demodulation, and thereafter, input to the controller 201.

If the controller 201 detects the notification frame on the basis of the signal input from the receiver 203, it confirms whether or not the self-terminal is specified as one to perform the uplink multiuser MIMO transmission in the notification frame. For example, the confirmation is made in terms of whether or not the identification information for the self-terminal is stored in any of the terminal information fields. Alternatively, a configuration may be used in which whether or not the identification information for the self-terminal is stored in the common information field is confirmed. Alternatively, a configuration may also be used in which the confirmation is made in terms of whether or not the group number to which the self-terminal belongs is set in the common information field.

If the controller 201 confirms that the self-terminal is specified, it confirms, as necessary, whether or not the information on the transmission method of the uplink multiuser MIMO (the common information, the individual information) for the terminal is stored in the common information field, terminal information field, or the both of these fields of the notification frame. If the information on the transmission method is stored, the controller 201 reads out the information on the transmission method from the corresponding field. If the read out information includes the information for identifying the preamble used for transmitting the data frame of the self-terminal, the preamble to be used is identified on the basis of the information. Note that the preamble to be used is given in advance, that preamble may be used. In this case, the preamble may be acquired by reading out a value stored in the buffer or the memory, of the both of these.

If the controller 201 confirms that the self-terminal is specified as one to perform the uplink multiuser MIMO transmission in the notification frame, it controls such that the data frame stored in the buffer 204 is read out, where the identified preamble to be used is specified as necessary, and transmitted to access point 11 the after elapse of a predetermined time period from receiving the notification frame. The data frame is transmitted via the transmitter 202 and the antenna 1A. The operation of the transmitter 202 is as described above.

A configuration may be used in which if a timing for the uplink multiuser MIMO transmission is specified in the notification frame, the transmission to the access point 11 is controlled to be made at the specified timing.

The controller 201, after transmitting the data frame by way of the uplink multiuser MIMO, waits for the acknowledgement response frame transmitted from the access point 11. If the controller 201 detects the acknowledgement response frame from the access point 11 (the usual acknowledgement response frame or the acknowledgement response frame with notification function) on the basis of the signal input from the receiver 203, it confirms whether or not the data frame transmitted by the self-terminal by way of the uplink multiuser MIMO is correctly received by the access point 11 based on the field of the acknowledgement response frame (the usual acknowledgement response frame and the acknowledgement response frame with notification function). For example, the bit for the self-terminal is identified from the Bitmap field of the acknowledgement response frame to make confirmation on the basis of the identified check result. The controller 201 includes a determinator determining whether or not the reception of the data frame transmitted by the self-terminal is succeeded by the access point 11.

If the controller 201 confirms that the data frame transmitted by way of the uplink multiuser MIMO is correctly received, it subjects the data frame stored in the buffer 204 to a deletion process or the like as necessary and ends the transmission process. On the other hand, if the data frame is confirmed not to be correctly received, the data frame is subjected to the retransmission process as necessary.

In the retransmission process, if a retry bit indicating the retransmission is defined in the Frame Control field of the data frame, the controller 201 controls such that the data frame not correctly transmitted has the retry bit set to "1", and thereafter the preamble to be used is specified as necessary, and is transmitted to access point 11 after elapse of a predetermined time period from receiving the acknowledgement response frame (the usual acknowledgement response frame or the acknowledgement response frame with notification function). The data frame is transmitted via the transmitter 202 and the antenna 1A. A configuration may be used in which if a timing for the uplink multiuser MIMO transmission of the retransmission data is specified in the acknowledgement response frame (the usual acknowledgement response frame or the acknowledgement response frame with notification function), the transmission to the access point 11 is controlled to be made at the specified timing.

If the controller 201 detects the acknowledgement response frame from the access point 11 on the basis of the signal input from the receiver 203, it confirms whether or not the frame has a field which notifies the information authorizing the uplink multiuser MIMO transmission of the new data frame (the common information field, the terminal information field, or the like). In other words, the controller 201 confirms whether or not the detected delivery acknowledgement frame is the acknowledgement response frame with notification function. For example, the determination may be made on the basis of the frame type of the Frame Control field, or on the basis of the frame length described in the physical header, or on the basis of the both of these. If the controller 201 identifies that the frame has the field, it confirms whether or not the self-terminal is specified as one to perform the uplink multiuser MIMO transmission on the basis of such a field. The controller 201 includes a determinator determining whether or not the self-terminal is specified as one to perform the uplink multiuser MIMO transmission in the acknowledgement response frame. For example, if the identification information for the self-terminal is contained in the common information field, any of the terminal information fields, or the both of these, the controller 201 determines that the terminal is specified. Alternatively, if identification information of the group to which the self-terminal belongs is contained in the common information field or the like, the terminal may be determined to be specified.

If the controller 201 confirms that the self-terminal is specified, similarly to the case of being specified in the notification frame, it controls such that the data frame stored in the buffer 204 is read out, where the identified preamble to be used is specified as necessary, and is transmitted to access point 11 after elapse of a predetermined time period from receiving the acknowledgement response frame (the usual acknowledgement response frame or the acknowledgement response frame with notification function). The data frame is transmitted via the transmitter 202 and the antenna 1A. A configuration may be used in which if a timing for the uplink multiuser MIMO transmission is specified in the acknowledgement response frame (the usual acknowledgement response frame or the acknowledgement response frame with notification function), the transmission to the access point 11 is controlled to be made at the specified timing.

Note that the frame transmitted by way of the uplink multiuser MIMO is described as the data frame, but various management frames or control frames other than the data frame can be transmitted by way of the uplink multiuser MIMO. The various management frames or control frames are also stored in the buffer 204 as necessary, and the controller 201 may read out from the buffer 204 and transmit.

The controller 201 may access a storage for storing the information to be transmitted to the access point 11 or the information received from the access point 11, or the both of these to read out the information. The storage may be a buffer included in the controller 201 (internal memory) or a buffer provided outside the controller 201 (external memory). The storage may be a volatile memory or a non-volatile memory. The storage may also be an SSD, a hard disk or the like other than the memory.

The above described isolation of the processes of the controller 201 and transmitter 202 is an example, and another form may be used. For example, the controller 201 may perform the process until the digital region process, and the transmitter 202 may perform the DA conversion and the subsequent processes. Similarly as for the isolation of the processes of the controller 201 and receiver 203, the receiver 203 may perform the process until the AD conversion and the controller 201 may perform the digital region process including the subsequent process of the physical layer. Isolation other than those described above may be used.

Figure 9:
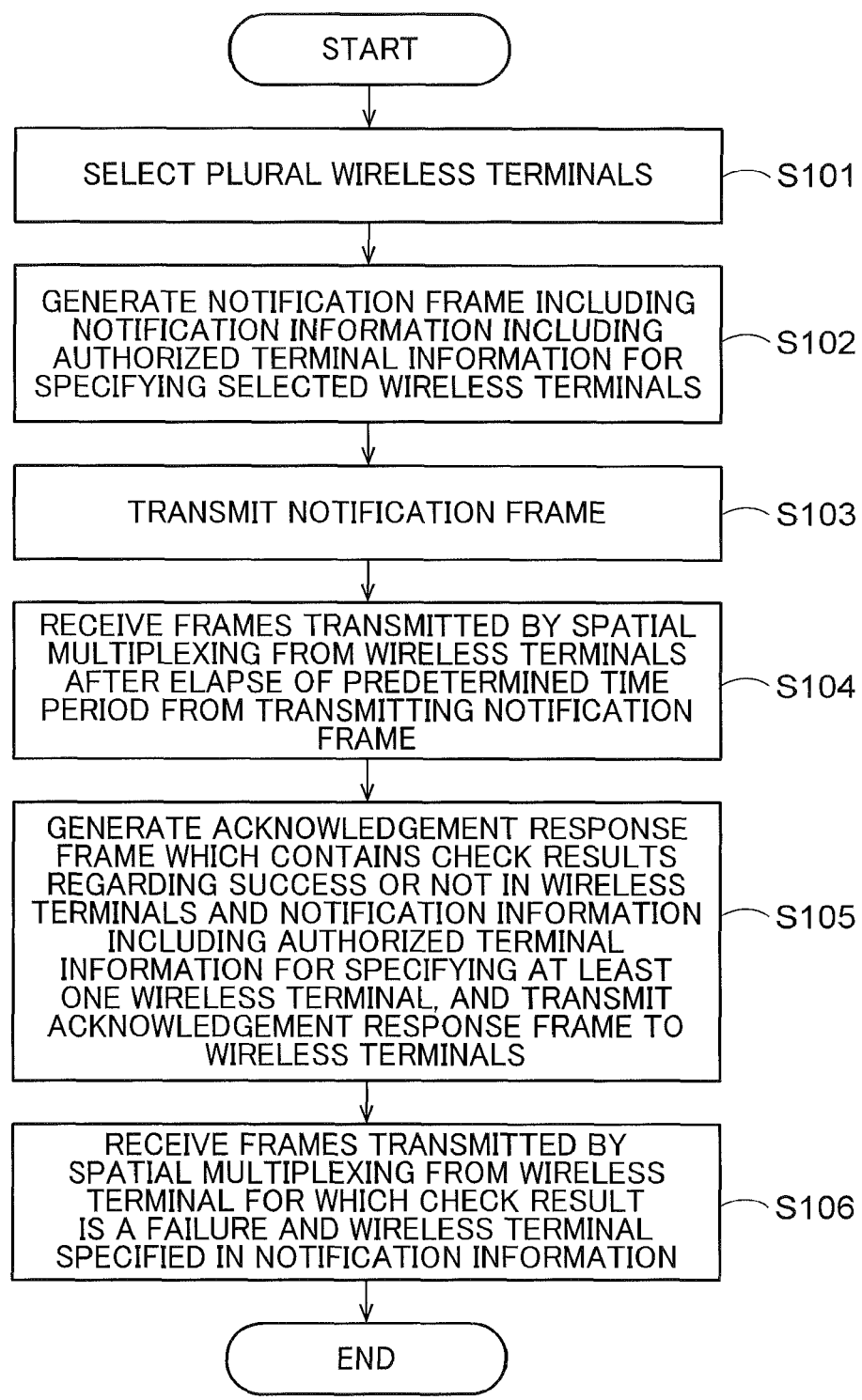
FIG. 9 is a flowchart of an operation of the access point according to the first embodiment.

FIG. 9 is a flowchart of an operation of the access point according to the first embodiment. The communication control device in the access point selects the plural wireless terminals (or the plural communication devices) specified as those to perform the uplink multiuser MIMO transmission (S101), and generates notification frame containing the notification information including the authorized terminal information for specifying the selected wireless terminals (S102). The communication control device in the access point acquires an access right for transmission and thereafter, transmits the notification frame via the wireless communicator (S103). The notification information may further include other information than the authorized terminal information, for example, information on the preambles used by the plural wireless terminals.

The communication control device in the access point receives via the wireless communicator the frames such as the data frames respectively transmitted by the spatial multiplexing from the plural wireless terminals specified in the notification frame after elapse of a predefined time period from transmitting the notification frame (S104). The preambles of the frames received from the wireless terminals are orthogonal to each other, which makes it possible to separate even the frames simultaneously received from the wireless terminals.

The communication control device in the access point generates the acknowledgement response frame which contains the check results indicating whether or not the frames received from the wireless terminals are successfully received and the notification information including the authorized terminal information for specifying at least one wireless terminal, and transmits the generated acknowledgement response frame to the wireless terminals (S105). As an example, the check results may be represented by the bitmap of success or not in the wireless terminals.

The communication control device in the access point receives the frames transmitted by the spatial multiplexing from the wireless terminal for which the check result represents a failure and the wireless terminal specified in the notification information after elapse of a predefined time period from transmitting the acknowledgement response frame (S106). The preambles of these frames are arranged so as to be orthogonal to each other.

Figure 10:
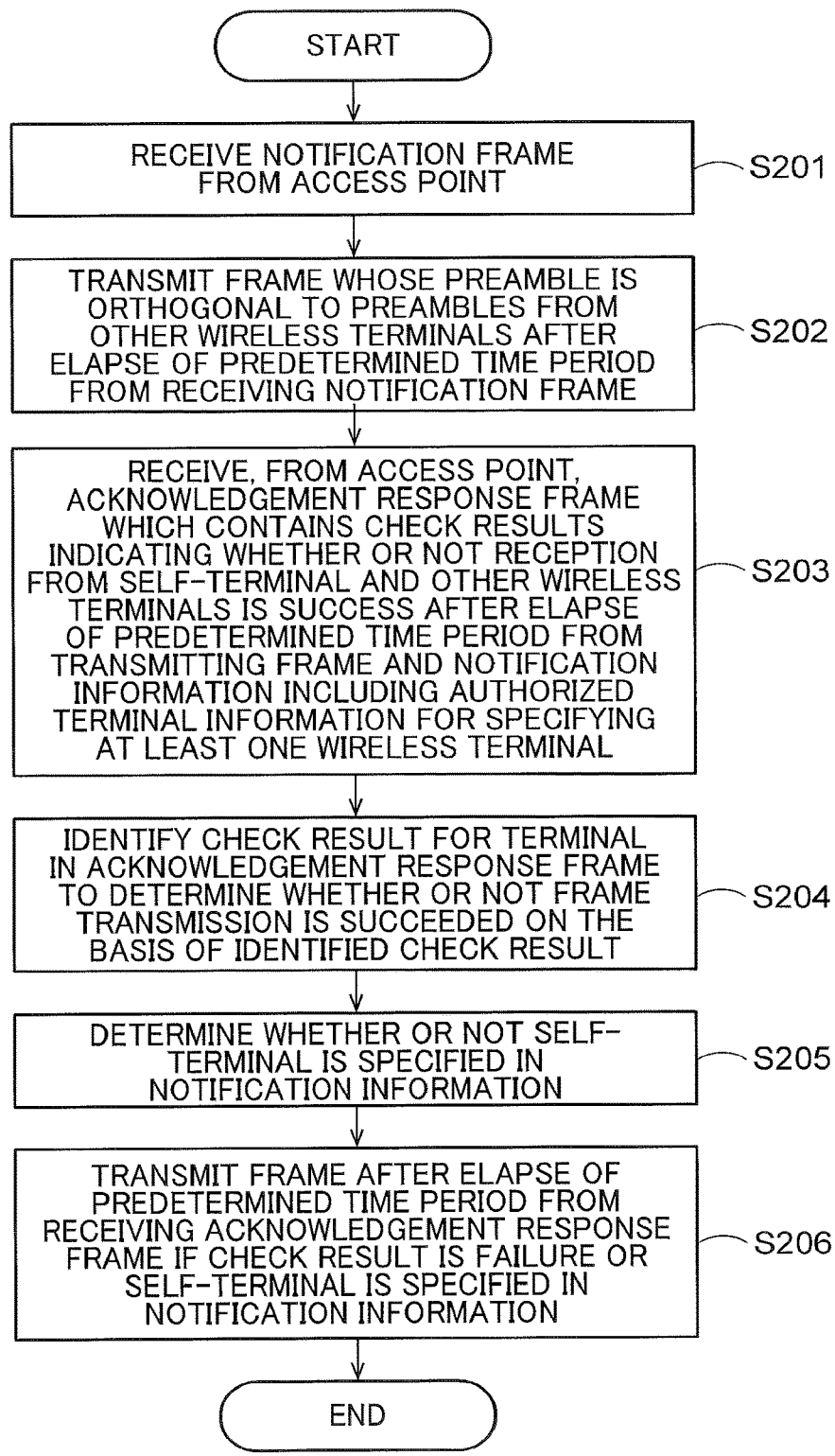
FIG. 10 is a flowchart of an operation of the wireless terminal according to the first embodiment.

FIG. 10 is a flowchart of an operation of the wireless terminal according to the first embodiment. The communication control device in the wireless terminal receives via the wireless communicator the notification frame containing the notification information including the authorized terminal information for specifying the plural wireless terminals including the self-terminal transmitted from the access point (S201). The notification information may include other information than the authorized terminal information, for example, information on the preamble used by each of the plural wireless terminals including the self-terminal.

The communication control device in the wireless terminal transmits the frame such as the data frame via the wireless communicator after elapse of a predefined time period from receiving the notification frame (S202). The preambles to be used of the frames transmitted from the wireless terminals are orthogonal to each other. For example, the preamble specified in the notification frame is used. The transmission is performed from the wireless terminals at the same time and at the same frequency band, which causes the spatial multiplexing transmission.

The communication control device in the wireless terminal receives the acknowledgement response frame transmitted from the access point after elapse of a predefined time period from transmitting the frames (S203). The acknowledgement response frame contains the check results indicating whether or not the access point successfully receives the frames from the wireless terminals, and the notification information including the authorized terminal information for specifying at least one wireless terminal. The communication control device in the wireless terminal identifies the check result for the terminal from the acknowledgement response frame to determine whether or not the frame transmission is succeeded on the basis of the identified check result (S204). In addition, whether or not the self-terminal is specified in the authorized terminal information is determined (S205). The wireless terminal, if the check result for the terminal represents a failure or the terminal is specified in the authorized terminal information, transmits the frame via the wireless communicator after elapse of a predefined time period from receiving the acknowledgement response frame (S206). The preambles to be used of the frames transmitted from the self-terminal and other wireless terminals are specified in advance to be orthogonal to each other. This causes the spatial multiplexing transmission from the self-terminal and other wireless terminals. Note that if the frame transmission is determined to be failed at step S204, step S205 may be omitted. Further, the order of step S205 and step S204 may be reversed, and in this case, if the self-terminal is determined to be specified at step S205, the frame transmission may be considered to be succeeded without confirming the check result and a new frame may be transmitted at step S206.

As described above, in the embodiment, in transmitting the acknowledgement response for the wireless terminals with respect to the uplink multiuser MIMO transmission, notification is made which notifies the wireless terminal to be authorized to perform new transmission by way of the uplink multiuser MIMO transmission, achieving the uplink multiuser MIMO transmission in which the retransmitted data frame and the new data frame are user-multiplexed at the same timing. This allows the user multiplexing number to be maintained above a certain value in the retransmission even if the uplink multiuser MIMO is applied, improving the system throughput owing to the high-efficiency.

(Second Embodiment)

Figure 11:
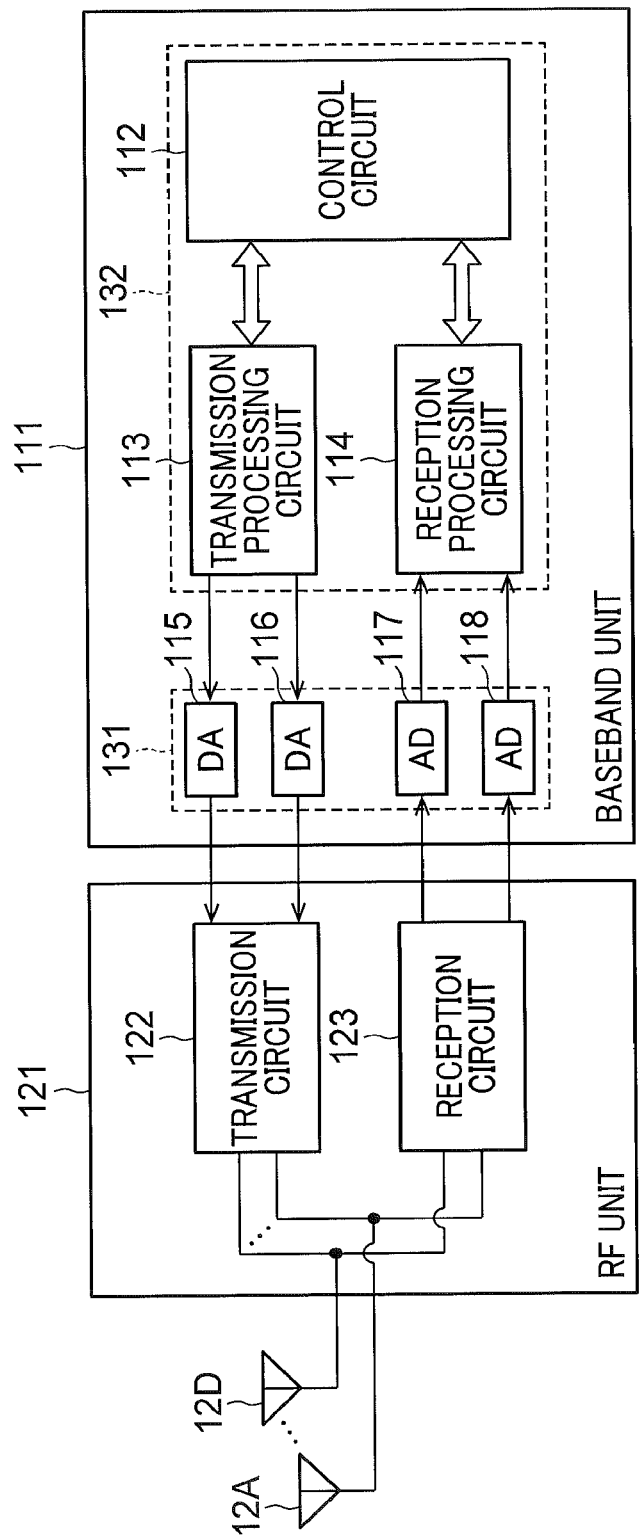
FIG. 11 is a diagram showing an exemplary hardware configuration of a wireless communication device installed at an access point according to a second embodiment.

FIG. 11 shows a hardware configuration example of a wireless communication device installed in the access point according to a second embodiment. This configuration example is merely one example, and the present embodiment is not limited thereto. Since the basic operations thereof are the same as those of the wireless communication device shown in FIG. 6, the description will be focused on differences between the configurations, and redundant descriptions will be omitted.

This wireless communication device includes a baseband unit 111, a RF unit 121, and antennas 12A to 12D.

The baseband unit 111 includes a control circuit (protocol stack) 112, a transmission processing circuit 113, a reception processing circuit 114, DA conversion circuits 115 and 116, and AD conversion circuits 117 and 118. The RF unit 121 and the baseband unit 111 may be configured by one IC chip (Integrated Circuit).

The baseband unit 111 is, as one example, a baseband LSI or a baseband IC. Alternatively, as another example, the baseband unit 111 may include an IC 132 and an IC 131. At this point, the IC 132 may include the control circuit 112, the transmission processing circuit 113, and the reception processing circuit 114, and the IC 131 may include the DA conversion circuits 115 and 116, and the AD conversion circuits 117 and 118.

The control circuit 112 corresponds, as one example, to a communication controlling device for controlling communication, or a controller for controlling communication. At this point, the wireless communicator may include the transmission processing circuit 113 and the reception processing circuit 114. The wireless communicator may further include the DA conversion circuits 115 and 116, and the AD conversion circuits 117 and 118, in addition to the transmission processing circuit 113 and the reception processing circuit 114. The wireless communicator may even further include a transmission circuit 122 and a reception circuit 123, in addition to the transmission processing circuit 113, the reception processing circuit 114, the DA conversion circuits 115 and 116, and the AD conversion circuits 117 and 118. The integrated circuit according to the present embodiment may include a processor that performs all or a part of the process of the baseband unit 111, that is, all or a part of the processes of the control circuit 112, the transmission processing circuit 113, the reception processing circuit 114, the DA conversion circuits 115 and 116, and the AD conversion circuits 117 and 118.

Alternatively, the IC 132 may correspond to the communication controlling device for controlling communication. At this point, the wireless communicator may include the transmission circuit 122 and the reception circuit 123. The wireless communicator may further include the DA conversion circuits 115 and 116, and the AD conversion circuits 117 and 118, in addition to the transmission circuit 122 and the reception circuit 123.

The control circuit 112 in the baseband unit 111 includes the buffer 104 of FIG. 7, and performs processes in the MAC layer and the like. The control circuit 112 may include the clock generation unit. The transmission processing circuit 113 performs a desired process in the physical layer such as a modulation process or an addition of a physical header, and creates, for example, two kinds of digital baseband signals (hereafter, referred to as a digital I signal and a digital Q signal). The DA conversion circuits 115 and 116 subject signals input from the transmission processing circuit 113 to the DA conversion. More specifically, the DA conversion circuit 115 converts the digital I signal into an analog I signal, and the DA conversion circuit 116 converts the digital Q signal into an analog Q signal. Note that the analog signals may be transmitted with a single-channel signal without the quadrature modulation. In this case, the number of the DA conversion circuits may be one. In addition, in the case where one or more channels of transmission signals are transmitted being distributed to a plurality of antennas, DA conversion circuits corresponding in number to the antennas may be provided.

The RF unit 121 is, as one example, an RF analog IC or an RF IC. The transmission circuit 122 in the RF unit 121 includes a transmission filter for extracting a signal in a desired band from the signal of the DA-converted frame, a mixer for upconverting the filtered signal into that of a radio frequency by making use of a signal of a certain frequency supplied from an oscillator, a preamplifier (PA) for amplifying the upconverted signal, and the like.

The reception circuit 123 in the RF unit 121 includes an LNA (Low Noise Amplifier) for amplifying the signals received by the antennas, a mixer for downconverting the amplified signals to the baseband by making use of a signal of a certain frequency supplied from an oscillator, a reception filter for extracting signals in a desired band from the downconverted signals, and the like. More specifically, the reception circuit 123 subjects the received signals that are subjected to low-noise amplification by a low noise amplifier (not shown) to quadrature demodulation with carriers the phase difference between which is 90° to create the I (In-phase) signal being in phase with the received signal, and a Q (Quad-phase) signal with a phase delayed by 90° from the I signal. These I signal and Q signal are adjusted in gain and output from the reception circuit 123.

The AD conversion circuits 117 and 118 in the baseband unit 111 perform AD conversion to the input signals from the reception circuit 123. More specifically, the AD conversion circuit 117 converts an I signal into a digital I signal, and the AD conversion circuit 118 converts a Q signal into a digital Q signal. Note that the analog signals may be received with a single-channel signal without the quadrature modulation. In this case, the number of the AD conversion circuits may be one. In addition, in the case where a plurality of antennas are provided, AD conversion circuits corresponding in number to the antennas may be provided. The reception processing circuit 114 processes the physical layer, processes a demodulation and the like. The control circuit 112 processes the MAC layer and the like to the demodulated frames. In addition, the control circuit 112 performs a process relating to the MIMO. For example, a process of channel estimation, a transmission weight calculation process, a separating process of streams, and the like are performed.

Note that a switch for switching the antennas 12A to 12D to any one of the transmission circuit 122 and the reception circuit 123 may be disposed in the RF unit. By the switching control, the antennas 12A to 12D are connected to the transmission circuit 122 in transmitting, and the antennas 12A to 12D are connected to the reception circuit 123 in receiving.

The detailed description of the process of the above-described components is obvious from the description of FIG. 7, and therefore redundant descriptions will be omitted.

Figure 12:
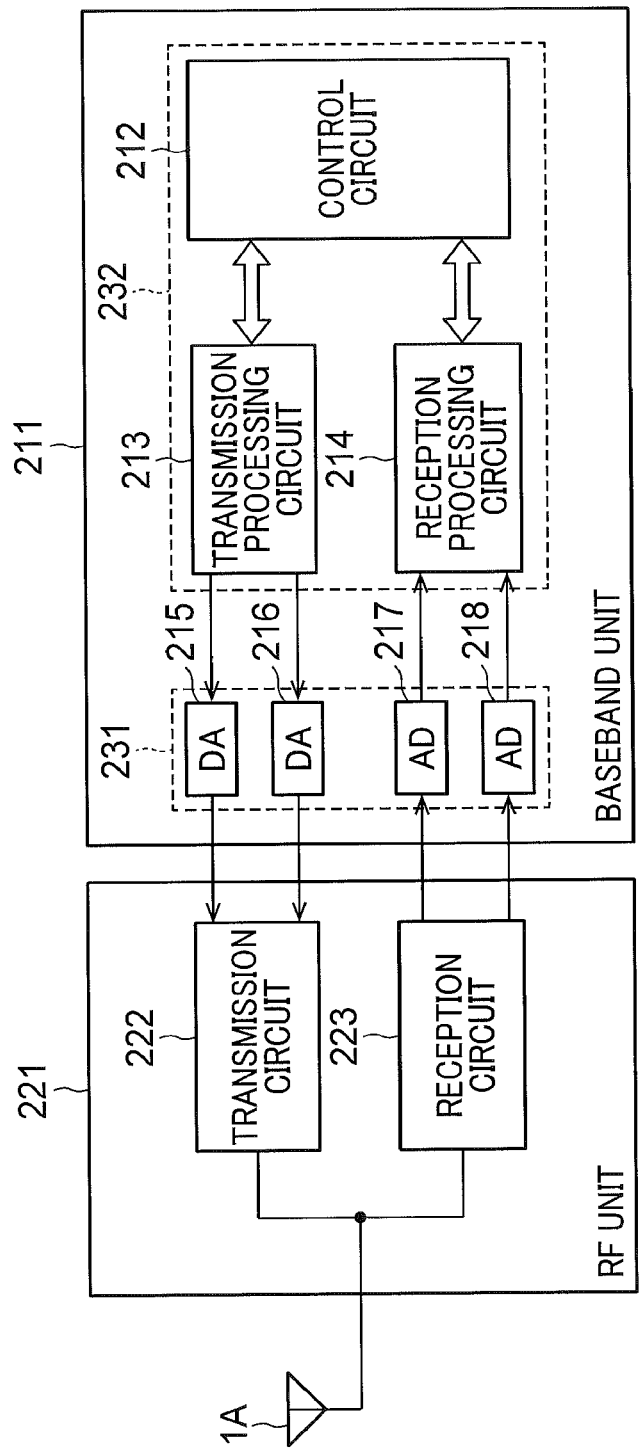
FIG. 12 is a diagram showing an exemplary hardware configuration of a wireless communication device installed at a wireless terminal according to the second embodiment.

FIG. 12 shows a hardware configuration example of a wireless communication device installed in the wireless terminal according to the second embodiment. This configuration example is merely one example, and the present embodiment is not limited thereto. Since the basic operations thereof are the same as those of the wireless communication device shown in FIG. 8, the description will be focused on differences between the configurations, and redundant descriptions will be omitted.

This wireless communication device includes a baseband unit 211, an RF unit 221, and an antenna 1A. The RF unit 221 and the baseband unit 211 may be configured by one IC chip.

The baseband unit 211 includes a control circuit (protocol stack) 212, a transmission processing circuit 213, a reception processing circuit 214, DA conversion circuits 215 and 216, and AD conversion circuits 217 and 218.

The baseband unit 211 is, as one example, a baseband LSI or a baseband IC. Alternatively, as another example, the baseband unit 211 may include an IC 232 and an IC 231. At this point, the IC 232 may include the control circuit 212, the transmission processing circuit 213, and the reception processing circuit 214, and the IC 231 may include the DA conversion circuits 215 and 216, and the AD conversion circuits 217 and 218.

The control circuit 212 corresponds, as one example, to a communication controlling device for controlling communication, or a controller for controlling communication. At this point, the wireless communicator may include the transmission processing circuit 213 and the reception processing circuit 214. The wireless communicator may further include the DA conversion circuits 215 and 216, and the AD conversion circuits 217 and 218, in addition to the transmission processing circuit 213 and the reception processing circuit 214. The wireless communicator may even further include a transmission circuit 222 and a reception circuit 223, in addition to the transmission processing circuit 213, the reception processing circuit 214, the DA conversion circuits 215 and 216, and the AD conversion circuits 217 and 218. The integrated circuit according to the present embodiment may include a processor that performs all or a part of the processing in the baseband unit 211, that is, all or a part of the processing in the control circuit 212, the transmission processing circuit 213, the reception processing circuit 214, the DA conversion circuits 215 and 216, and the AD conversion circuits 217 and 218.

Alternatively, the IC 232 may correspond to the communication controlling device for controlling communication. At this point, the wireless communicator may include the transmission circuit 222 and the reception circuit 223. The wireless communicator may further include, in addition to the transmission circuit 222 and the reception circuit 223, the DA conversion circuits 215 and 216, and the AD conversion circuits 217 and 218.

The control circuit 212 in the baseband unit 211 includes the buffer 204 of FIG. 8, and performs processes in the MAC layer and the like. The control circuit 212 may include the clock generation unit. The transmission processing circuit 213 performs a desired process in the physical layer such as a modulation process or an addition of a physical header, and creates, for example, two kinds of digital baseband signals (hereafter, referred to as a digital I signal and a digital Q signal). In the case of the MIMO transmission, the two kind of digital baseband signals are created for each stream. The DA conversion circuits 215 and 216 subject signals input from the transmission processing circuit 213 to the DA conversion. More specifically, the DA conversion circuit 215 converts the digital I signal into an analog I signal, the DA conversion circuit 216 converts the digital Q signal into an analog Q signal. Note that the analog signals may be transmitted with a single-channel signal without the quadrature modulation. In this case, the number of DA conversion circuits may be one. In addition, in the case where one or more channels of transmission signals are transmitted being distributed to a plurality of antennas, DA conversion circuits corresponding in number to the antennas may be provided.

The RF unit 221 is, as one example, an RF analog IC or an RF IC. The transmission circuit 222 in the RF unit 221 includes a transmission filter for extracting a signal in a desired band from the signal of the DA-converted frame, a mixer for upconverting the filtered signal into that of a radio frequency by making use of a signal of a certain frequency supplied from an oscillator, a preamplifier (PA) for amplifying the upconverted signal, and the like.

The reception circuit 223 includes an LNA (Low Noise Amplifier) for amplifying the signal received by the antenna, a mixer for downconverting the amplified signal into that of a baseband by making use of a signal of a certain frequency supplied from an oscillator, a reception filter for extracting a signal in a desired band from the downconverted signal, and the like. More specifically, the reception circuit 223 subjects the received signals that is subjected to low-noise amplification by a low noise amplifier (not shown) to quadrature demodulation with carriers the phase difference between which is 90° to create the I (In-phase) signal being in phase with the received signal and the Q (Quad-phase) signal with a phase delayed by 90° from the I signal. These I signal and Q signal are adjusted in gain and output from the reception circuit 223.

The AD conversion circuits 217 and 218 in the baseband unit 211 perform AD conversion to the input signal from the reception circuit 223. Although two systems of AD conversion circuit here, which perform parallel processing, are provided here, the number of the AD conversion circuits may be one. More specifically, the AD conversion circuit 117 converts an I signal into a digital I signal, and the AD conversion circuit 118 converts the Q signal into a digital Q signal. Note that the analog signals may be received with a single-channel signal without the quadrature modulation. In this case, the number of the AD conversion circuits may be one. In addition, in the case where a plurality of antennas are provided, AD conversion circuits corresponding in number to the antennas may be provided. The reception processing circuit 214 performs a process in the physical layer, a demodulation process, and the like. The control circuit 212 performs processes in the MAC layer and the like to the demodulated frame.

Alternatively, in the case where the wireless terminal includes a plurality of antennas to support MIMO, the control circuit 212 also performs a process relating to MIMO. For example, a process of channel estimation, a transmission weight calculation process, a separate process of streams, and the like are performed.

Note that a switch for switching the antenna 1A to any one of the transmission circuit 222 and the reception circuit 223 may be disposed in the RF unit 221. By the switching control, the antenna 1A is connected to the transmission circuit 222 when transmitting, and the antenna 1A is connected to the reception circuit 223 when receiving.

The detailed description of the process of the above-described components is obvious from the description of FIG. 8, and therefore redundant descriptions will be omitted.

(Third Embodiment)

Figure 13:
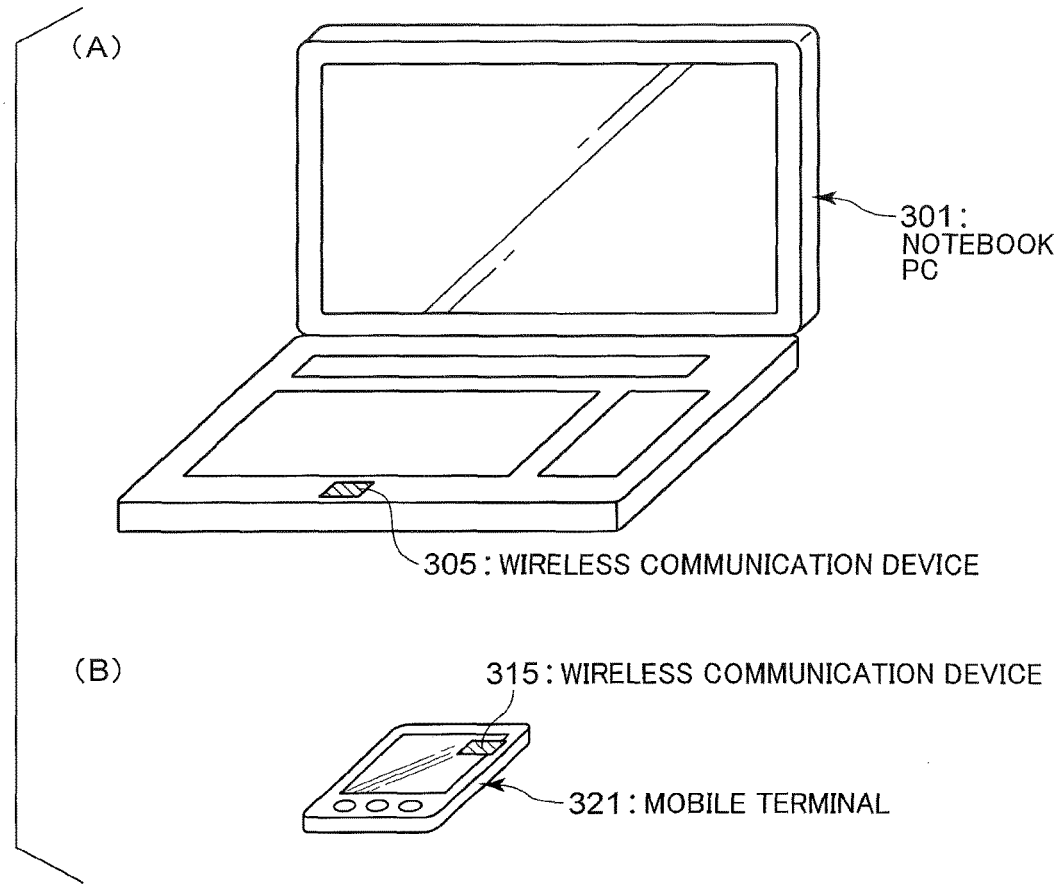
FIG. 13 is a perspective view of a wireless terminal according to a third embodiment.

FIG. 13(A) and FIG. 13(B) are perspective views of wireless terminal according to the third embodiment. The wireless terminal in FIG. 13(A) is a notebook PC 301 and the wireless communication device in FIG. 13(B) is a mobile terminal 321. The notebook PC 301 and the mobile terminal 321 are equipped with wireless communication devices 305 and 315 respectively. For the wireless communication devices 305 and 315, it is possible to use the wireless communication device provided in a wireless terminal, an access point which have been described above or both of them. The wireless terminal equipped with the wireless communication device is not limited to the notebook PC and the mobile terminal. For example, it can be provided in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 14:
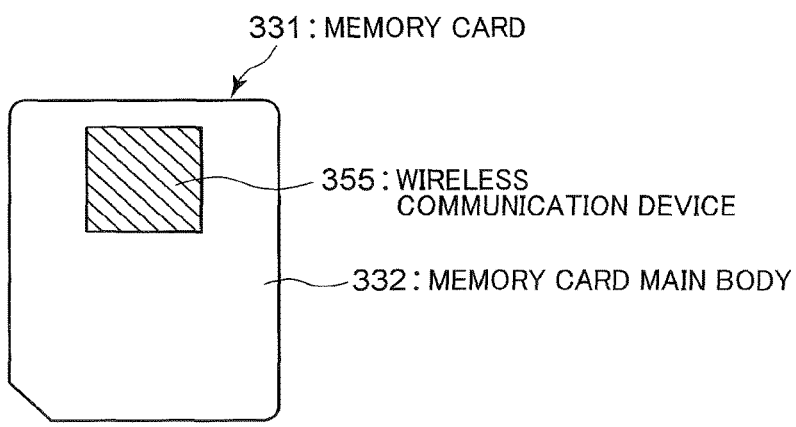
FIG. 14 is a diagram showing a memory card according to the third embodiment.

Moreover, a wireless communication device installed in a terminal or an access point can also be installed in a memory card. FIG. 14 illustrates an example of mounting the wireless communication device on the memory card. A memory card 331 includes a wireless communication device 355 and a body case 332. The memory card 331 uses the wireless communication device 355 for wireless communication with an external device (a wireless terminal, an access point or both of them, etc.). Here, in FIG. 14, the description of other elements (for example, a memory, and so on) in the memory card 331 is omitted.

(Fourth Embodiment)

In the fourth embodiment, a bus, a processor unit and an external interface unit are provided in addition to the configuration of the wireless communication device (wireless communication device of the access point, the wireless communication device of the wireless terminal or both of them) according to any of the first to third embodiments. The processor unit and the external interface unit are connected with a buffer through the bus. Firmware operates in the processor unit. Thus, by adopting a configuration in which the firmware is included in the wireless communication device, it becomes possible to easily change the function of the wireless communication device by rewriting the firmware. The processing unit in which the firmware operates may be a processor that performs the process of the communication controlling device or the controller according to the present embodiment, or may be another processor that performs a process relating to extending or altering the functions of the process of the communication controlling device or the controller. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Fifth Embodiment)

In the fifth embodiment, a clock generating unit is provided in addition to the configuration of the wireless communication device (wireless communication device of the access point, the wireless communication device of the wireless terminal or both of them) according to any of the first to third embodiments. The clock generating unit generates a clock and outputs the clock from an output terminal to the external of the wireless communication device. Thus, by outputting the clock generated in the wireless communication device to the external and operating the host side by means of the clock output to the external, it becomes possible to operate the host side and the wireless communication device side in a synchronized manner.

(Sixth Embodiment)

In the sixth embodiment, a power source unit, a power source controlling unit and a wireless power feeding unit are included in addition to the configuration of the wireless communication device (wireless communication device of the access point, the wireless communication device of the wireless terminal or both of them) according to any of the first to third embodiments. The power supply controlling unit is connected with the power source unit and the wireless power feeding unit, and performs control to select a power source supplied to the wireless communication device. Thus, by adopting a configuration in which the power source is included in the wireless communication device, power consumption reduction operations that control the power source become possible.

(Seventh Embodiment)

In the seventh embodiment, a SIM card is included in addition to the configuration of the wireless communication device according to the sixth embodiment. For example, the SIM card is connected may be connected to the transmitter (102 or 202), the receiver (103 or 203), the controller (101 or 201), or a plurality of elements of them in the wireless communication device. Thus, by adopting a configuration in which the SIM card is included in the wireless communication device, it becomes possible to easily perform authentication processing.

(Eighth Embodiment)

In the eighth embodiment, a video image compressing/decompressing unit is included in addition to the configuration of the wireless communication device according to the fourth embodiment. The video image compressing/decompressing unit is connected with a bus. Thus, by adopting a configuration in which the video image compressing/decompressing unit is included in the wireless communication device, it becomes possible to easily transmit a compressed video image and decompress a compressed video image received.

(Ninth Embodiment)

In the ninth embodiment, an LED unit is included in addition to the configuration of the wireless communication device (wireless communication device of the access point, the wireless communication device of the wireless terminal or both of them) according to any of the first to third embodiments. For example, the LED unit is connected with may be connected to the transmitter (102 or 202), the receiver (103 or 203), the controller (101 or 201), or a plurality of elements of them in the wireless communication device. Thus, by adopting a configuration in which the LED unit is included in the wireless communication device, it becomes possible to easily notify the operation state of the wireless communication device to the user.

(Tenth Embodiment)

In the tenth embodiment, a vibrator unit is included in addition to the configuration of the wireless communication device (wireless communication device of the access point, the wireless communication device of the wireless terminal or both of them) according to any of the first to third embodiments. For example, the vibrator unit is connected may be connected to the transmitter (102 or 202), the receiver (103 or 203), the controller (101 or 201), or a plurality of elements of them in the wireless communication device. Thus, by adopting a configuration in which the vibrator unit is included in the wireless communication device, it becomes possible to easily notify the operation state of the wireless communication device to the user.

(Eleventh Embodiment)

In an eleventh embodiment, the configuration of the wireless communication device includes a display in addition to the configuration of the wireless communication device (wireless communication device of the access point, the wireless communication device of the wireless terminal or both of them) according to any one of the first to third embodiments. The display may be connected to the controller (101 or 201) of the wireless communication device via a bus (not shown). As seen from the above, the configuration including the display to display the operation state of the wireless communication device on the display allows the operation status of the wireless communication device to be easily notified to a user.

(Twelfth Embodiment)

In the present embodiment, [1] the frame type in the wireless communication system, [2] a procedure of disconnecting wireless communication devices, [3] an access scheme of a wireless LAN system and [4] an interframe space of a wireless LAN are described.

[1] Frame Type in Communication System

Generally, as mentioned above, frames handled on a wireless access protocol in a wireless communication system are roughly divided into the three types of the data frame, the management frame and the control frame. These types are normally shown in a header part which is commonly provided to frames. As a display method of the frame type, the three types may be distinguished in one field or may be distinguished by a combination of two fields.

The management frame is a frame used to manage a physical communication link with another wireless communication device. For example, there are frames used to perform communication settings with the other wireless communication device or a frame to release communication links (that is, to disconnect the connection), and a frame related to power saving operations in the wireless communication device.

The data frame is a frame to transmit data generated in the wireless communication device to the other wireless communication device after a physical communication link with the other wireless communication device is established. The data is generated in a higher layer of the present embodiment and generated by, for example, a user's operation.

The control frame is a frame used to perform control at the time of transmission and reception (exchange) of the data frame with the other wireless communication device. A response frame, transmitted as acknowledgment in a case where the wireless communication device receives the data frame or the management frame, belongs to the control frame.

These three types of frames are subjected to processing as necessary in the physical layer and then transmitted as physical packets via an antenna. Here, in a procedure of establishing connection, a connection request frame and a connection reception frame are management frames, and it is possible to use the response frame of the control frame as a confirmation frame with respect to the connection reception frame.

[2] Procedure of Disconnecting Wireless Communication Devices

For disconnecting follows an explicit procedure and an implicit procedure. According to the explicit procedure, a frame to disconnect any one of the connected wireless communication devices is transmitted. This frame is classified as a management frame. The frame for disconnecting may be, for example, referred to as "a release frame" meaning it releases connection. Normally, it is determined that the connection is disconnected at the time of transmitting the release frame in a wireless communication device on the transmission side and at the time of receiving the release frame in a wireless communication device on the reception side. Afterward, it returns to the initial state in a communication phase, for example, a state of searching a wireless communication device of the communicating partner. This is because, at the time of transmitting the frame for disconnecting, a physical wireless link may not be secured due to, for example, the communication distance to the wireless communication device target of connection is considerable and radio signals cannot be received or decoded.

On the other hand, according to the implicit procedure, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a procedure is provided because, in a state where it is determined that the connection is disconnected as mentioned above, a state is considered where the physical wireless link cannot be secured due to, for example, the communication distance to the wireless communication device target of connection is considerable and radio signals cannot be received or decoded. That is, it is because the reception of the release frame cannot be expected.

As a specific example of determining the disconnection of connection in an implicit manner, a timer is used. For example, at the time of transmitting a data frame that requests an acknowledgment response frame, a first timer (for example, a retransmission timer for a data frame) that limits the retransmission period of the frame is activated, and, if the acknowledgement response frame to the data frame is not received before the expiration of the first timer (that is, before a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, it is stopped every time the frame is newly received from the wireless communication device of the connection partner, and it is reactivated from the initial value. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received before the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although it is identical to that used in the former case as second timer, a different timer may be also used.

[3] Access Scheme of Wireless LAN System

For example, there is a wireless LAN system which is assumed to communicate or compete with a plurality of wireless communication devices. CSMA/CA is set as the basis of an access scheme in the IEEE802.11 (including an expansion standard or the like) wireless LAN. In a scheme in which transmission by a certain wireless communication device is detected and transmission is performed after a predetermined time from the transmission end, simultaneous transmission is performed in the plurality of wireless communication devices that detect the transmission by the wireless communication device, and, as a result, radio signals collide and frame transmission fails. By detecting the transmission by the certain wireless communication device and waiting for a random time from the transmission end, transmission by the plurality of wireless communication devices that detect the transmission by the wireless communication device is stochastically distributed. Therefore, if the number of wireless communication devices assigned the earliest time out of a random of times is one, frame transmission by the wireless communication device succeeds and frame collision can be prevented. Since the acquisition of the transmission right based on the random value becomes impartial between the plurality of wireless communication devices, it can be said that a scheme adopting Carrier Avoidance is a suitable scheme to share a wireless medium between the plurality of wireless communication devices.

[4] Interframe Space of Wireless LAN

The interframe space of the IEEE802.11 wireless LAN is described. There are six types of interframe spaces used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the interframe space is defined as a continuous period that should confirm and open the idle carrier sense before transmission in the IEEE802.11 wireless LAN, and a strict period from a previous frame is not discussed. Therefore, the above defined definition is adhered to through the explanation of the IEEE802.11 wireless LAN system. In the IEEE802.11 wireless LAN, a waiting time at the time of random access based on CSMA/CA is assumed to be the sum of a predetermined time and a random time, and it can be said that such a definition intends to clarify the predetermined time.

DIFS and AIFS are interframe spaces used when attempting the frame exchange start in a contention period that competes with other wireless communication devices based on CSMA/CA. DIFS is used in a case where the right of priority according to the traffic type is not distinguished, AIFS is used in a case where the right of priority by traffic identifier (TID) is provided.

Since DIFS and AIFS are used in similar operation, AIFS is chiefly used to give the explanation below. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified by priority at the time of access on the basis of the traffic type. The class at the time of this access is referred to as "access category (AC)". Therefore, the value of AIFS is provided in every access category.

PIFS is an interframe space to enable an access more preferential than that of other competing wireless communication devices, and the period is shorter than the values of DIFS and AIFS. SIFS is an interframe space which can be used in a case where frame exchange continues in a burst manner at the time of transmission of a control frame of a response system or once the access right is acquired. EIFS is an interframe space caused when frame reception fails.

RIFS is an interframe space which can be used in a case where a plurality of frames are continuously transmitted to the same wireless communication device in a burst manner once the access right is acquired, and a response frame from a wireless communication device of the transmission partner is not requested while RIFS is used.

Figure 15:
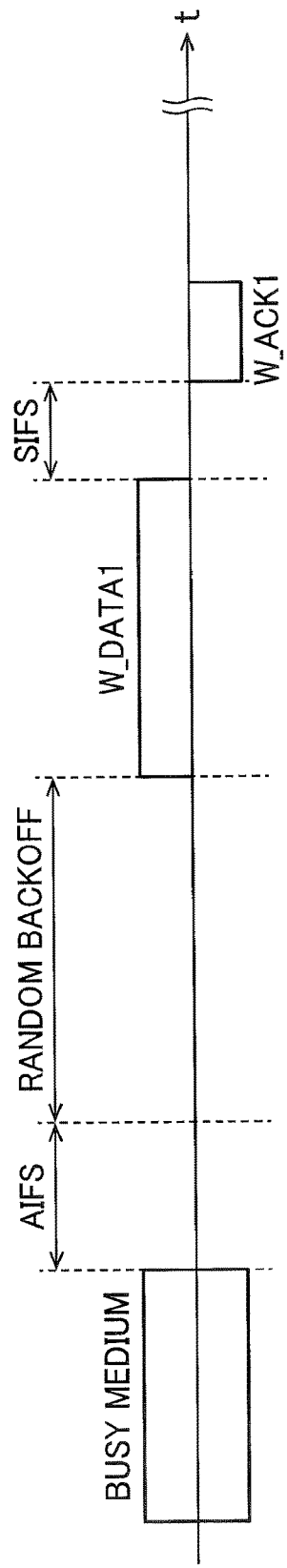
FIG. 15 is a diagram showing an example of frame exchange during a contention period.

Here, FIG. 15 illustrates one example of frame exchange in a competitive period based on the random access in the IEEE802.11 wireless LAN.

When a transmission request of a data frame (W_DATA1) is generated in a certain wireless communication device, it is assumed that it is recognized that a medium is busy (busy medium) as a result of carrier sense. In this case, AIFS of a fixed time is set from the time point at which the carrier sense becomes idle, and, when a random time (random backoff) is set afterward, data frame W_DATA1 is transmitted to the communicating partner.

The random time is acquired by multiplying a slot time by a pseudorandom integer derived from the uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values for every access category. In a wireless communication device of transmission destination of W_DATA1, when reception of the data frame succeeds, a response frame (W_ACK1) is transmitted after SIFS from the reception end time point. If W_ACK1 is received within a transmission burst time limit, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined for every physical layer. Moreover, although parameters to which the value of each access category such as AIGS, CWmin and CWmax is set can be set every communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs and DIFS is 34 μs, the default value of the interframe space of an access category of BACKGROUND (AC_BK) in AIFS is 79 μs, the default value of the interframe space of BEST EFFORT (AC_BE) is 43 μs, the default value of the interframe space between VIDEO (AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of the time lengths of response frames in a case where SIFS and DIFS are transmitted at the lowest obligatory physical rate. In the present embodiment, a wireless communication system using parameters at such interframe spaces is assumed to be an interfering system with a wide communication range.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a receiver configured to receive a plurality of first frames transmitted by multiuser spatial multiplexing from a plurality of wireless communication devices wherein transmitter addresses of the first frames are different from each other; and
   a transmitter configured to transmit a second frame including a first field and a second field, the first field contains check results indicating whether the first frames are successfully received and the second field contains first information specifying at least one communication device of the plurality of wireless communication devices, wherein
   the receiver is configured to receive a plurality of third frames transmitted by multiuser spatial multiplexing in response to the second frame from a communication device for which the check result of the first frame have been a failure among the plurality of wireless communication devices and from the at least one communication device specified in the first information.

2. The wireless communication device according to claim 1, wherein preambles of the plurality of first frames are orthogonal to each other, and preambles of the plurality of third frames are orthogonal to each other.

3. The wireless communication device according to claim 1, wherein the at least one communication device specified in the first information is selected from among communication devices for which the check results of the first frames have been successes among the plurality of communication devices.

4. The wireless communication device according to claim 1, wherein the at least one communication device specified in the first information is different from communication devices having transmitted the first frames.

5. The wireless communication device according to claim 1, wherein a number of communication devices which are specified in the first information is equal to or less than a value subtracted by a number of communication devices for which the check results of the first frames have been failures from a maximum multiplexing number of spatial multiplexing.

6. The wireless communication device according to claim 1, wherein the first information includes identification information of a group to which the at least one communication device belong.

7. The wireless communication device according to claim 1, wherein the transmitter is configured to transmit a fourth frame including information to specify communication devices, and receives the plurality of first frames transmitted from the communication devices specified in the information of the fourth frame by the multiuser spatial multiplexing after transmitting the fourth frame.

8. The wireless communication device according to claim 1, comprising at least one antenna.

9. The wireless communication device according to claim 1, wherein the first field contains a bitmap of the check results indicating whether the first frames are successfully received.

10. The wireless communication device according to claim 1, wherein the second field contains an identifier of the at least one communication device of the plurality of wireless communication devices.

11. The wireless communication device according to claim 1, wherein the receiver is configured to receive the plurality of third frames in a predetermined period of time after the transmitter transmits the second frame.

12. A wireless communication device corresponding to one of a plurality of wireless communication devices comprising:
    a transmitter configured to transmit a first frame;
    a receiver configured to receive a third frame including a first field and a second field, the first field contains check results indicating whether the first frame and a second frame are successfully received, and the second field contains first information specifying at least one communication device, wherein the second frame is transmitted from a first wireless communication device of the plurality of wireless communication devices by multiuser spatial multiplexing with the first frame, and a transmitter address of the second frame is different from a transmitter address of the first frame; and
    the transmitter is configured to transmit a fourth frame in at least one of a case where the check result for the first frame is a failure or a case where the wireless communication device is specified in the first information, wherein
    the transmitter transmits the fourth frame by multiuser spatial multiplexing with at least one of a fifth frame or a sixth frame, the fifth frame being transmitted by a second communication device of the plurality of wireless communication devices, the second communication device is specified in the first information, and the sixth frame being transmitted by the first communication device for which the check result of the second frame has been a failure, and
    transmitter addresses of the fourth frame, the fifth frame, and the sixth frame are different from each other.

13. The wireless communication device according to claim 12, wherein a preamble of the first frame is orthogonal to a preamble of the second frame.

14. The wireless communication device according to claim 12, wherein a preamble of the fourth frame is orthogonal to at least one of a preamble of the fifth frame or a preamble of the sixth frame.

15. The wireless communication device according to claim 12, wherein
the receiver is configured to receive a seventh frame containing information on a preamble transmission method, and
the transmitter is configured to transmit the first frame containing the preamble determined by the preamble transmission method after receiving the seventh frame.

16. The wireless communication device according to claim 12, wherein the transmitter is configured to transmit at least a frame for retransmission of the first frame in a case where the check result of the first frame has been failure, as the fourth frame.

17. The wireless communication device according to claim 12, wherein the transmitter is configured to transmit at least a frame different from the first frame in a case where the wireless communication device is specified in the first information, as the fourth frame.

18. The wireless communication device according to claim 12, wherein the first information includes at least identification information of a group to which the at least one communication device belongs, and
in a case where the wireless communication device belongs to the group specified by the identification information, the transmitter is configured to transmit the fourth frame.

19. The wireless communication device according to claim 12, comprising at least one antenna.

20. A wireless communication method comprising:
receiving a plurality of first frames transmitted by multiuser spatial multiplexing from a plurality of communication devices wherein transmitter addresses of the first frames are different from each other;
transmitting a second frame including a first field and a second field, the first field contains check results indicating whether the first frames are successfully received and the second field contains first information specifying at least one communication device of the plurality of wireless communication devices; and
receiving a plurality of third frames transmitted by multiuser spatial multiplexing in response to the second frame from a communication device for which the check result of the first frame has been a failure among the plurality of communication devices and from the at least one communication device specified in the first information.

21. The method according to claim 20, wherein the at least one communication device specified in the first information is selected from among communication devices for which the check results of the first flames have been successes among the plurality of communication devices.

22. The wireless communication device according to claim 20, wherein the at least one communication device specified in the first information is different from communication devices having transmitted the first frames.

23. The wireless communication device according to claim 20, wherein a number of communication devices which are specified in the first information is equal to or less than a value subtracted by a number of communication devices for which the check results of the first frames have been failures from a maximum multiplexing number of spatial multiplexing.

* * * * *